US010979593B2

(12) United States Patent
Kanoh et al.

(10) Patent No.: US 10,979,593 B2
(45) Date of Patent: Apr. 13, 2021

(54) OUTPUT METHOD AND SYSTEM FOR ATTACHING DATA TO BE OUTPUT TO MESSAGE

(71) Applicant: SHARP KABUSHIKI KAISHA, Sakai (JP)

(72) Inventors: Takayuki Kanoh, Sakai (JP); Takaya Nakatani, Sakai (JP); Yuusuke Nakatani, Sakai (JP); Hiroki Munetomo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/599,745

(22) Filed: Oct. 11, 2019

(65) Prior Publication Data
US 2020/0120231 A1 Apr. 16, 2020

(30) Foreign Application Priority Data
Oct. 16, 2018 (JP) .............................. JP2018-195381

(51) Int. Cl.
H04N 1/00 (2006.01)
H04N 1/32 (2006.01)
(52) U.S. Cl.
CPC ..... H04N 1/32112 (2013.01); H04N 1/00212 (2013.01); H04N 1/00214 (2013.01)

(58) Field of Classification Search
CPC .......... H04N 1/32112; H04N 1/00214; H04N 1/00212; G06F 3/1208; G06F 3/1287; G06F 3/1204; G06F 3/1268
See application file for complete search history.

(56) References Cited

U.S. PATENT DOCUMENTS

| 2013/0169831 A1* | 7/2013 | Tomi | G06F 3/1204 |
| | | | 348/207.2 |
| 2015/0116761 A1* | 4/2015 | Yamada | G06F 3/1204 |
| | | | 358/1.15 |
| 2016/0308840 A1* | 10/2016 | Munshi | H04L 51/08 |
| 2017/0061248 A1* | 3/2017 | Ryan, Jr. | G06K 9/6256 |

FOREIGN PATENT DOCUMENTS

JP 2005-267002 A 9/2005

* cited by examiner

Primary Examiner — Juan M Guillermety
(74) Attorney, Agent, or Firm — ScienBiziP, P.C.

(57) ABSTRACT

An output method for receiving output data that is associated with acquired identification information from a server and outputting an image based on the output data from an image forming apparatus is provided. The output method includes: accepting posting of a message from a terminal to a messaging service; sending attachment data to the server when the message includes the attachment data; and issuing identification information that is associated with output data based on the attachment data when the attachment data is in a format that can be accepted for registration.

5 Claims, 30 Drawing Sheets

OUTPUT METHOD AND SYSTEM FOR ATTACHING DATA TO BE OUTPUT TO MESSAGE

BACKGROUND OF THE INVENTION

Field of the Invention

The present invention relates to an output method and the like.

Description of the Background Art

Conventionally, a so-called network print service has been proposed in which a network such as the Internet is used to upload data such as image data and the uploaded data is output from a multifunction device placed in a store or the like (for example, see Japanese Unexamined Patent Application Publication No. 2005-267002).

In recent years, use of a messaging service, which is a service that can exchange messages between users, has become widespread, and a technique of providing a specified service based on the message sent from the user is also used. In this case, the user can use the various services using the messaging service.

In general, membership registration is required to use the network print system, and it takes extra time for the user. For example, a login name (for example, an email address) and a password have to be set for the membership registration.

On the other hand, a network print service that does not require the membership registration is also considered. However, it is desirable to know a sending source of the image data accepted by a print server, and it is not preferred to quit the membership registration. In recent years, there are many services requiring the membership registration, and management of the password for each of the multiple services is troublesome. Thus, there is a problem of an increased burden on the membership registration.

In view of the above-mentioned problem, an object of the present invention is to provide an output method and the like capable of appropriately outputting data from an image forming apparatus by simply attaching the data to be output from the image forming apparatus to a message posted to a messaging service.

SUMMARY OF THE INVENTION

In order to solve the above-described problem, the present invention provides an output method for receiving output data that is associated with acquired identification information from a server and outputting an image based on the output data from an image forming apparatus, the output method including:
  accepting posting of a message from a terminal to a messaging service;
  sending attachment data to the server when the message includes the attachment data; and
  issuing identification information that is associated with output data based on the attachment data when the attachment data is in a format that can be accepted for registration.

A system according to the present invention is a system that includes a terminal, an image forming apparatus, a communication server, a print server, and a relay server that can be connected to the communication server and the print server.

The communication server includes:
  an acceptor that accepts posting of a message from the terminal; and
  a first controller that notifies the relay server that attachment data is received when the attachment data is included in the message.

The relay server includes:
  a receiver that receives the attachment data from the communication server upon reception of a notification; and
  a sender that sends the attachment data received by the receiver to the print server.

The print server includes:
  a storage that stores the attachment data as output data; and
  a second controller that issues identification information for identifying the output data.

The image forming apparatus includes:
  a receiver that acquires the identification information and receives output data associated with the identification information from the print server; and
  an output device that outputs an image based on the output data.

According to the present invention, it is possible to appropriately output data from the image forming apparatus simply by attaching the data to the message to be posted to the messaging service. By using the messaging service, a user does not have to newly register for a printing service from the image forming apparatus, and a service side can easily grasp a sending source of the data.

DESCRIPTION OF THE PREFERRED EMBODIMENTS

A description will hereinafter be made on embodiments of the present invention with reference to the drawings. In this embodiment, a network print system including a relay server, to which the present invention is applied, will be described as an example.

1. First Embodiment 1.1 Overall Configuration

Figure 1:
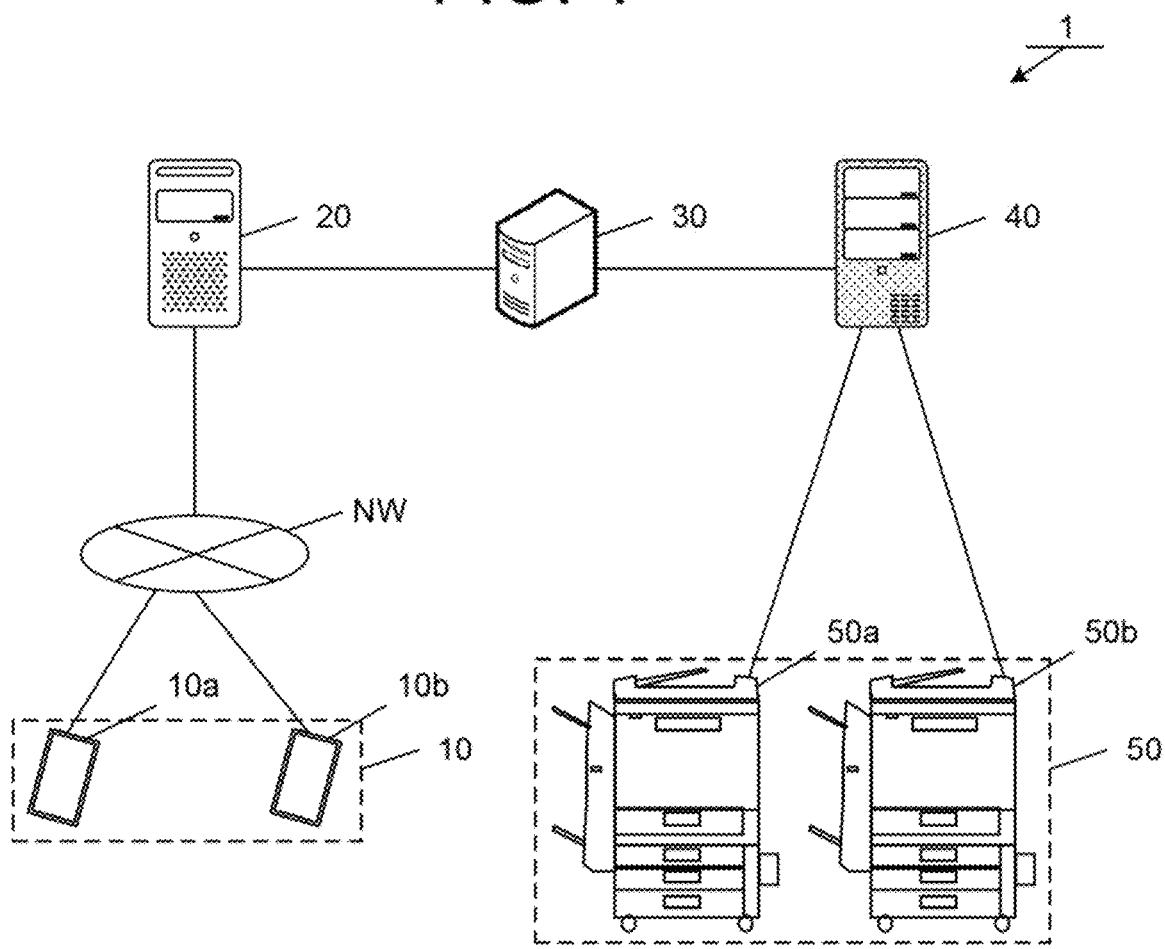
FIG. 1 is a view for illustrating an overall configuration of a network print system in a first embodiment.

A description will firstly be made on an overall configuration of a network print system 1 of this embodiment with reference to FIG. 1. As illustrated in FIG. 1, the network print system 1 includes a terminal 10, a communication server 20, a relay server 30, a print server 40, and an image forming apparatus 50.

The terminal 10 is connected to the communication server 20 via a network NW in this embodiment, the network NW will be described as an external network such as the Internet. However, the terminal 10 may be connected to the communication server 20 via another communicator (for example, a local area network (LAN) or a serial interface such as RS-232C).

In addition, the communication server 20 and the relay server 30 are mutually connected, the relay server 30 and the print server 40 are mutually connected, and the print server 40 and the image forming apparatus 50 are mutually connected. However, it may be connected via a serial interface such as LAN or RS-232C. As a connection method of these components, these components may be connected by the external network such as the Internet or may be connected by the serial interface such as the LAN or RS-232C.

The terminal 10 is an information processor that is operated by a user of the image forming apparatus 50. The terminal 10 is, for example, a smartphone, a tablet computer, or a personal computer (PC).

The terminal 10 can run an application (hereinafter referred to as a "messenger application") for using a service capable of exchanging messages between the devices (hereinafter referred to as a "messaging service"). The messaging service is a service that sends the message posted by the user who uses the service to another user who uses the messaging service. The messaging service may be provided as a single service, or may be provided as one of multiple functions as in a social networking service.

The user of the messaging service runs the messenger application and posts the message to the messaging service via the messenger application. The posted message is sent to the user who is designated as a sending destination via the messaging service. In this way, it is possible to send the message to an external device used by the user who is designated as the sending destination and to receive the message from the external device.

The message in this embodiment is a content posted to the messaging service by the user who uses the messaging service. For example, the message includes text data input by the user.

The message can also include attachment data. The attachment data is data that is displayed or the like when the messenger application executes display/playback processing, and examples of the attachment data are image data, document data, video data, and audio data.

The attachment data may be sent instead of the message, or may be sent separately from the message. In this case, the content of the message may indicate the attachment data. The document data is data that is created by using word-processing software, spreadsheet software, presentation software or Portable Document Format (PDF) data. The message indicating the attachment data is a message that has a content indicating a storage location of the attachment data. For example, such a message can specify the location of the attachment data, such as a file path or a Uniform Resource Locator (URL). Here, the message indicating the attachment data may include attributes of the attachment data (for example, data size, a format, hash, and the like of the attachment data)

When the attachment data is posted by the user, the messenger application posts the message indicating the attachment data to the messaging service. In the case where the message is the message indicating the attachment data, the messenger application may acquire the attachment data and display/play the attachment data.

In addition, the message in this embodiment may include not only the message input by the user but also information on an account (information on the account of a sending source or the sending destination) and sent date and time.

The account indicates the user who uses the messaging service. For example, the account includes an account name, the email address, or a serial number with which the user can uniquely be identified. In this embodiment, a description will be made under the assumption that the message includes the account name as the information on the account and that the user as the sending destination and the user as the sending source can each be specified by the account name.

The communication server 20 is a server that provides the messaging service, and stores the message that is sent from the device connected to the communication server 20. In the case where the device using the messaging service requests the message, the communication server 20 sends the message to the device that requests the message. At this time, the communication server 20 may send the message in which the user who uses the device requesting the message is designated as the sending destination.

The communication server 20 may store the device using the messaging service and the information on the account in association with each other. For example, the communication server 20 stores an identification number of the device using the messaging service, address information such as an IP address, and the account name in association with each other, so as to be able to specify the device used by the user who is specified by the account name. In this way, the communication server 20 can notify the device, which corresponds to the account name as the sending destination of the message, of reception of the message. With such notification, the user, who is specified by the account name indicated as the sending destination of the message, can be notified that the message is received.

The relay server 30 is a server that generates a response message to the message acquired from the communication server 20 and sends the response message to the communication server 20. In this way, the user of the terminal 10 and the relay server 30 can make dialogue realized by exchanging the message. In the case where the message is the message indicating the attachment data, the relay server 30 acquires the attachment data on the basis of the message indicating the attachment data, and determines whether the acquired attachment data is data that can be accepted for registration in the network print system 1. The data that can be accepted for the registration is data that can be output from the image forming apparatus 50 in the network print system 1. Whether the data is the data that can be accepted for the registration is determined on the basis of the data format, the data size, the data content, the number of the data, or the like, for example. In the case where it is determined whether the data is the data that can be accepted for the registration on the basis of the data format, the relay server 30 determines that the attachment data can be accepted for the registration when the acquired attachment file is included in the predetermined data format relayed by the relay server 30. In the case where it is determined whether the data is the data that can be accepted for the registration on the basis of the data size, the relay server 30 determines that the attachment data can be accepted for the registration when the data size of the attachment data is equal to or smaller than an upper limit value of the predetermined data size that can be relayed (can be accepted for the registration). In the case where it is determined whether the data is the data that can be accepted for the registration on the basis of the data content, the determination is made on the basis of a degree of similarity between the attachment data and the predetermined image data that cannot be relayed or on the basis of whether the attachment data includes a predetermined keyword that disallows transfer of the attachment data. In the case where it is determined whether the data is the data that can be accepted for the registration on the basis of the number of the data, the relay server 30 determines that the attachment data can be accepted for the registration when the number of the attachment data is equal to or smaller than an upper limit value of the predetermined number of the data that can be relayed. For example, when the attachment data in such a number that cannot be output from the image forming apparatus 50 at a time is acquired, the attachment data that cannot be output is not accepted for the registration. Just as described, in the case where the acquired attachment data is the data that can be accepted for the registration the relay server 30 relays (sends) the acquired attachment data to the print server 40.

The user of the terminal 10 can send the message to the relay server 30 by acquiring an account for the relay server 30 (for example, an account name for a network print service). For example, information on the account for the network print service is displayed as a two-dimensional code on a casing of the image forming apparatus 50 or a display 530. When the terminal 10 reads the two-dimensional code, the user of the terminal 10 can acquire the account for the network print service. In addition to the account, the two-dimensional code may include a user name for the relay server 30 and profile image data. In addition, the terminal 10 may acquire the account from the relay server 30 on the basis of the acquired account. The terminal 10 displays the user name for the relay server 30 and the profile image on a display 120, and can thereby make the user of the terminal 10 recognize that the message can be set to the relay server 30.

The print server 40 is a server that provides the network print service. The image forming apparatus 50 is an apparatus that is connected to the print server 40 and by which the user can use the network print service. The image forming apparatus 50 is, for example, a multifunction machine placed in a convenience store. Here, the network print service is a service in which the print server 40 as a server that provides the network print service receives the image data or the document data from the external device through the network and the image forming apparatus 50 outputs the received data.

When receiving the image data or the document data from the external device, the print server 40 temporarily stores the received data and issues a user number. Then, the print server 40 stores the received data as output data. At this time, the print server 40 associates the output data and the user number with each other. The output data is data that can be output from the image forming apparatus 50. For example, the output data is print data that can be printed out by the image forming apparatus 50 or file data that can be output as a file from the image forming apparatus 50. The print data is data that can be printed out by the image forming apparatus 50 when the image forming apparatus 50 reads the print data. For example, the print data is the image data, page description language (PDL) data, or data that stores a print command executable by the image forming apparatus 50. The file data is data that can be handled as the file by the terminal 10 or the PC. For example, the file data is a PDF file, an XML Paper Specification (XPS) file, or a text file. The attachment data of the message, which is posted to the messaging service, is relayed (sent) from the relay server 30, and the print server 40 can thereby store the attachment data as the output data. The user number is identification information (print data identification information) used to identify the output data. The user number only needs to be used for identification of the print data, may be the serial number, may be a code including a character string according to a specified rule, or may be a character string in which the multiple number of characters are arranged at random. Then, the print server 40 associates the user number and the output data with each other.

In this embodiment, a description will be made on the assumption that the output data is the print data. More specifically, the attachment data that is included in the message posted by the user is stored as the print data in the print server 40, and the print data and the user number are associated with each other.

The image forming apparatus 50 is an apparatus that can copy a document brought in by the user, print out the data stored in a recording medium, and send/receive facsimile (FAX) data. In addition, when the user selects the use of the network print service, the image forming apparatus 50 prompts the user to input the user number. Once the user inputs the user number, the image forming apparatus 50 sends the input user number to the print server 40. Then, the print server 40 receives the print data associated with the user number. The image forming apparatus 50 executes print processing on the basis of the received print data.

As illustrated in FIG. 1, in regard to the terminal 10, multiple terminals (10a, 10b) may be connected to the network NW. In the case where the terminal 10a sends the message to the terminal 10b, the terminal 10a sets the account of the user of the terminal 10a as the sending source, sets the account of the user of the terminal 10b as the sending destination, and sends the message to the communication server 20. The terminal 10b receives the message, in which the account of the user of the terminal 10b is set as the sending destination, from the communication server 20, and thereby receives the message sent to the terminal 10b. Then, the message is displayed by the messenger application in the terminal 10b.

In regard to the image forming apparatus 50, multiple image forming apparatuses (50a, 50b) may be connected to the print server 40, For example, the image forming apparatus 50a and the image forming apparatus 50b may be placed in different stores. At this time, the print data stored in the print server 40 can be received by any of the image forming apparatuses 50 that are the image forming apparatus 50a and the image forming apparatus 50b. Accordingly, as long as the image forming apparatus 50 is connected to the print server 40, the user can execute the print processing based on the print data in any image forming apparatus 50. Thus, the user uploads the image data or the like for the network print service and can thereby print out the image data using the image forming apparatus 50 in the vicinity of the user among the multiple image forming apparatuses 50.

1.2 Functional Configuration 1.2.1 Terminal Device

Figure 2:
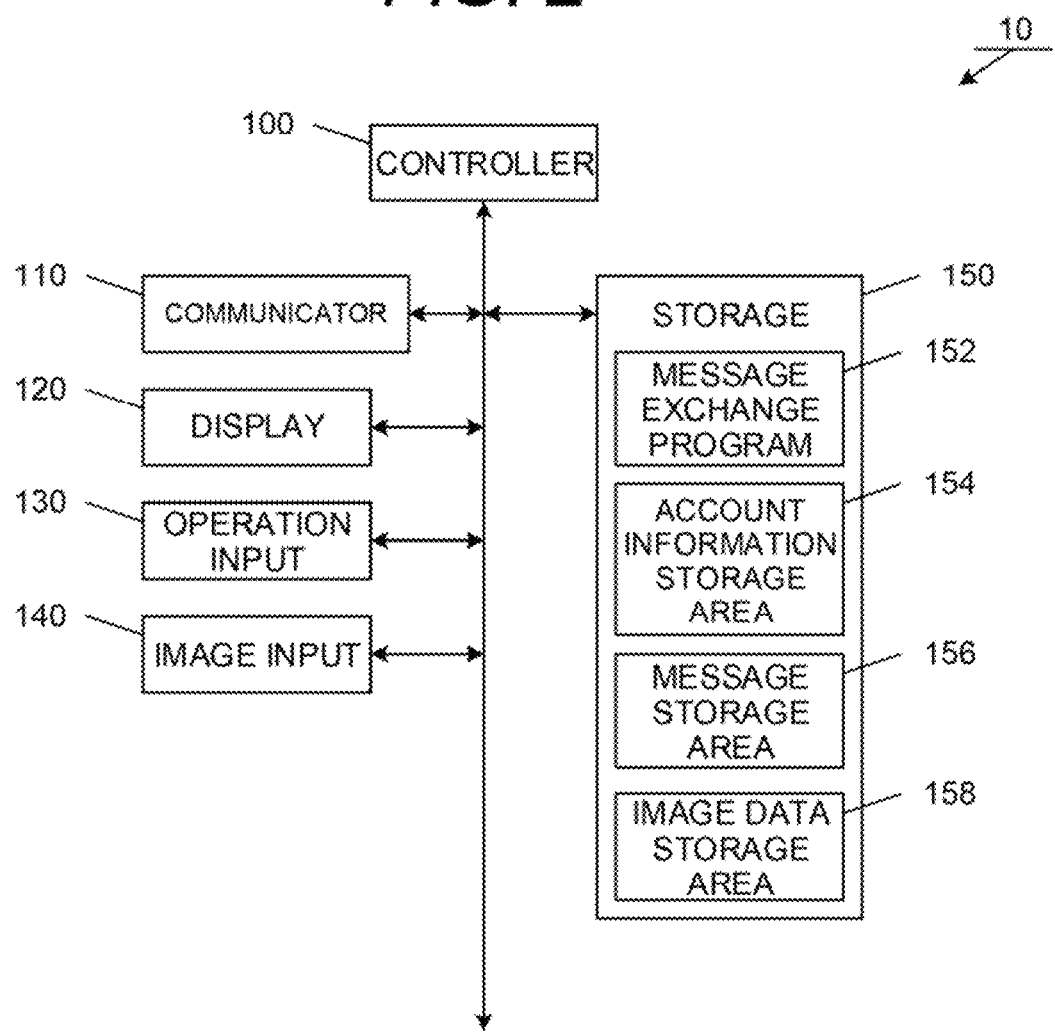
FIG. 2 is a diagram for illustrating a functional configuration of a terminal in the first embodiment.

A description will be made on a functional configuration of the terminal 10 with reference to FIG. 2. As illustrated in FIG. 2, the terminal 10 includes a controller 100, a communicator 110, a display 120, an operation input 130, and an image input 140.

The controller 100 is a function device for controlling the entire terminal 10. The controller 100 reads and runs various programs to realize various functions, and includes one or multiple arithmetic devices (for example, central processing units (CPUs)).

The communicable method 110 is a function device for the terminal 10 to communicate with external equipment. For example, the communicable method 110 includes a network interface card (NIC) used in a wired/wireless LAN and a communication module that can be connected to Long Term Evolution (LTE)/LTE-Advanced (LTE-A)/License-Assisted Access using LTE (LAA)/5G line.

The display 120 is a function device for displaying various information to the user, and includes a liquid crystal display (LCD) and the like, for example. The operation input 130 is a function device for accepting an operation instruction from the user, and includes various key switches, a device that detects input by contact, and the like. The user inputs a function to be used and an output condition via the operation input 130. The terminal 10 may include a touchscreen in which the display 120 and the operation input 130 are integrally formed. In this case, a method for detecting the input on the touchscreen only needs to be a general detection method such as a resistance film method, an infrared method, electromagnetic induction method, or a capacitance method. The operation input 130 may include various operation devices such as a mouse and a keyboard.

The image input 140 is a function device that receives an image signal sent from an image input device such as a camera and outputs the image signal as the image data. The image input 140 includes a camera built in the terminal 10, for example. The image input 140 may be configured as a terminal that is connected to the camera as the external device, or may be configured to acquire the image data from the external device via the network from the communicable method 110.

A storage 150 is a function device that stores the various programs required for the operation of the terminal 10 and the various data. The storage 150 includes a solid-state drive (SSD), a hard disk drive (HDD), or the like as a semiconductor memory, for example.

The storage 150 stores a message exchange program 152 that makes the terminal 10 functions as the messenger application. In addition, an account information storage area 154, a message storage area 156, and an image data storage area 158 are secured in the storage 150.

The message exchange program 152 is a program that realizes a function of exchanging the message with the external device. The message exchange program 152 realizes a function of inputting the content of the message to be sent to the external device and a function of displaying the message received from the external device. The message exchange program 152 may display the messages received from the external device by arranging the messages in an order of the message sent date and time. In this embodiment such display will be referred to as "timeline". The user of the terminal 10 can send (post) the message while looking at the timeline. In addition, the timeline may provide display associated with the message. For example, in the case where the message is the text data, the text data may be displayed in a balloon. In the case where the message is the message indicating the attachment data, and the attachment data is the image data that is too large to fit on the display 120, the image data may be reduced in screen size for the display.

The account information storage area 154 is an area for storing account information that is the information on the account of the user who uses the messaging service. The account information may include information such as the account name, a user name, and the profile image data. The message exchange program 152 displays a list of the user names and the profile image data on the basis of the account information stored in the account information storage area 154, and thereby allows the user to select the user set as the sending destination of the message.

The message storage area 156 is an area for storing the messages sent from the terminal 10 and received by the terminal 10. The messages stored in the message storage area 156 are read by the message exchange program 152, and the timeline is thereby displayed.

The image data storage area 158 is an area for storing the image data to be output by the image input 140. For example, the image data is stored as an image file in the image data storage area 158. The individual image data only needs to be stored in an identifiable format. For example, the image data may be stored in a database format.

1.2.2 Communication Server

Figure 3:
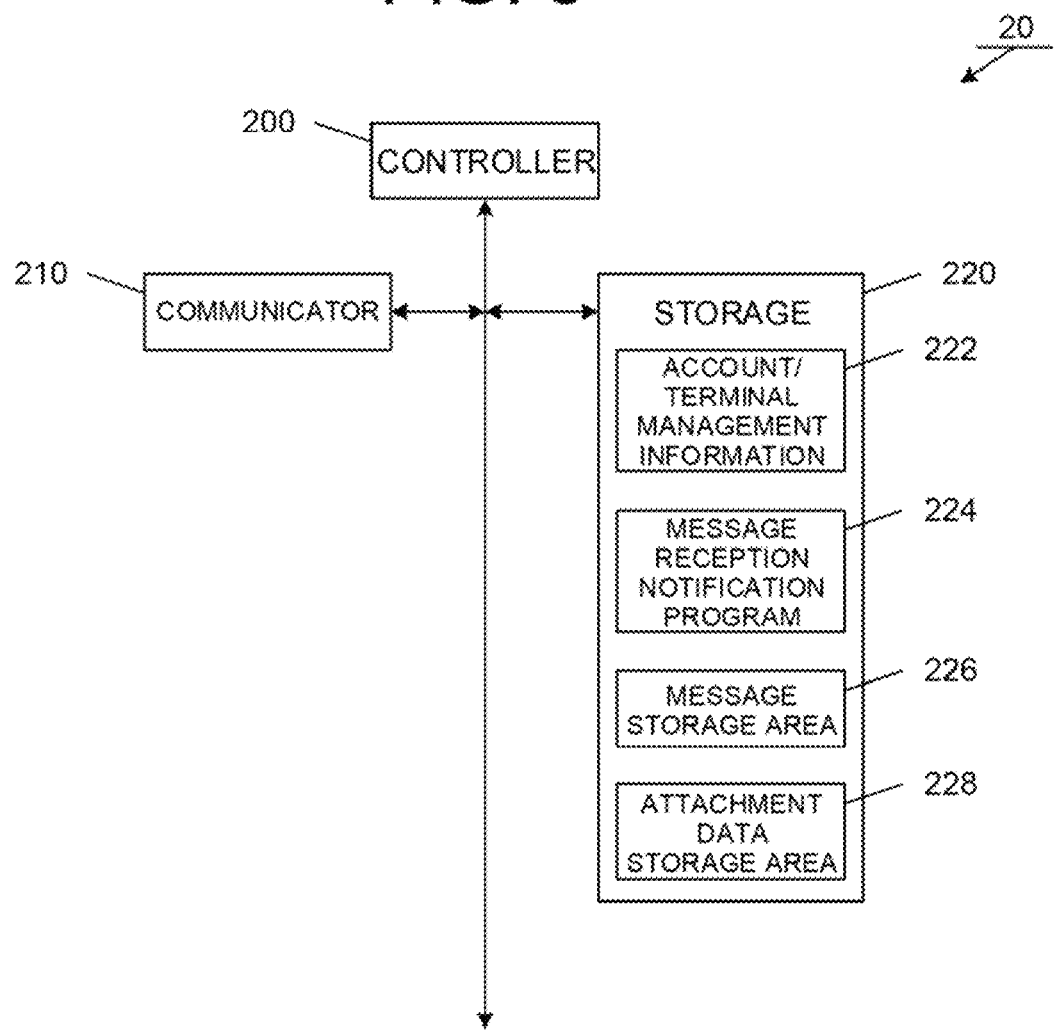
FIG. 3 is a diagram for illustrating a functional configuration of a communication server in the first embodiment.

A description will be made on a functional configuration of the communication server 20 with reference to FIG. 3. As illustrated in FIG. 3, the communication server 20 includes a controller 200, a communicator 210, and a storage 220.

The controller 200 is a function device for controlling the entire communication server 20. The controller 200 reads and runs various programs to realize various functions, and includes one or multiple arithmetic devices (for example, the CPUs).

The communicator 210 is a function device for the communication server 20 to communicate with the external equipment. For example, the communicator 210 includes the NIC used in the wired/wireless LAN and a communication module that can be connected to the LTE/LTE-A/LAA/5G line.

The storage 220 is a function device that stores the various programs required for operation of the communication server 20 and various data. The storage 220 includes the SSD, the HDD, or the like as the semiconductor memory, for example.

The storage 220 stores account/terminal management information 222 and a message reception notification program 224. In addition, a message storage area 226 and an attachment data storage area 228 are secured in the storage 220.

The account/terminal management information 222 is the information on the account of the user who uses the messaging service and information on the device connected to the messaging service. As the information on the account, for example, information such as the account name and the profile image are stored in the account/terminal management information 222. In addition, as the information on the device connected to the messaging service, device identification information used to identify the device is stored in the account/terminal management information 222.

As the information on the account, authentication information used to authenticate the user (for example, the password) may be stored. In this case, the account name and the password are included in a message request. The communication server 20 sends the message in the case where the account name and the password included in the message request respectively match the account name and the password stored in the account/terminal management information 222. In this way, confidentiality of message sending can be increased.

The message reception notification program 224 is a program that notifies the device, which is associated with the device identification information associated with the account name indicated as the sending destination of the message, of the reception of the message when the message is received. The device that has received the notification by the message reception notification program 224 sends the message request to the communication server 20 and can thereby receive the message. The message reception notification program 224 may make the notification based on the received message. For example, in the case where the message is the text data, a part of the text data (for example, a character string of 20 characters from the beginning) may be included in the notification. In the case where the message is the message indicating the attachment data, information on the format of the attachment data (for example, that the attachment data is the image data) may be included in the notification.

The message storage area 226 is an area that stores the message sent from the device using the messaging service. The attachment data storage area 228 is an area that stores the attachment data on the basis of the message indicating the attachment data in the case where the message is the message indicating the attachment data. The attachment data is stored as the file (the image file of the document file) in the attachment data storage area 228, for example. The individual attachment data only has to be stored in the identifiable format and may be stored in the database format, for example.

1.2.3 Relay Server

Figure 4:
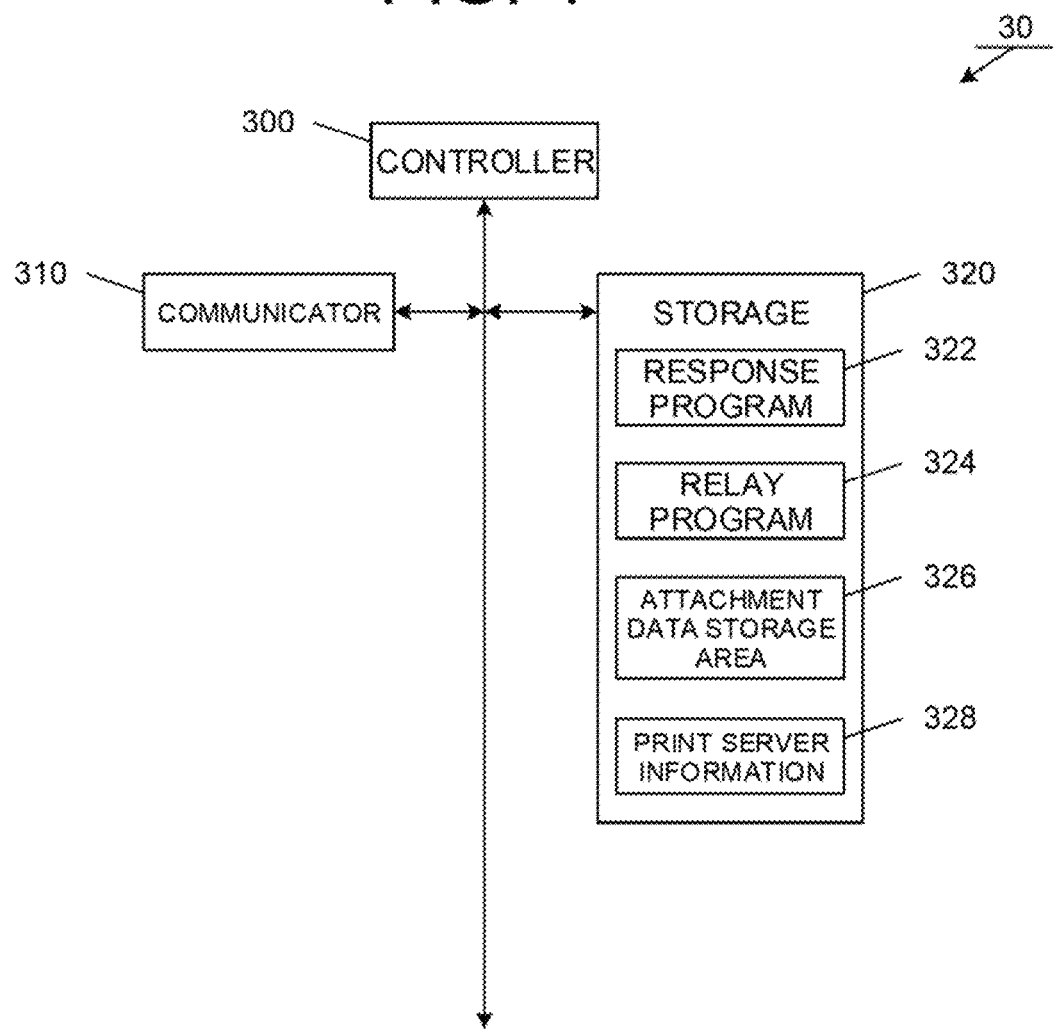
FIG. 4 is a diagram for illustrating a functional configuration of a relay server in the first embodiment.

A description will be made on a functional configuration of the relay server 30 with reference to FIG. 4. As illustrated in FIG. 4, the relay server 30 includes a controller 300, a communicator 310, and a storage 320.

The controller 300 is a function device for controlling the entire relay server 30. The controller 300 reads and runs various programs to realize various functions, and includes one or multiple arithmetic devices (for example, the CPUs).

The communicator 310 is a function device for the relay server 30 to communicate with the external equipment. For example, the communicator 310 includes the NIC used in the wired/wireless LAN and a communication module that can be connected to the LTE/LTE-A/LAA/5G line.

The storage 320 is a function device that stores the various programs required for operation of the relay server 30 and various data. The storage 320 includes the SSD, the HDD, or the like as the semiconductor memory, for example.

The storage 320 stores a response program 322, a relay program 324, and print server information 328. In addition, an attachment data storage area 326 is secured in the storage 320.

The response program 322 is a program that generates a response message with the account of the sending source of the received message being set as the sending destination and posts (sends) the response message to the communication server 20 when receiving the message from the communication server 20. For example, when receiving the message indicating the attachment data, the response program 322 generates, as the response, a message including the user number and an output method, and posts the message to the communication server 20.

The relay program 324 is a program that receives the attachment data from the communication server 20 on the basis of the message indicating the attachment data, and sends the received attachment data to the print server 40. The attachment data storage area 326 is an area that stores the attachment data received by the relay program 324. The print server information 328 is information on the print server 40. For example, the print server information 328 is the address information, such as the IP address, of the print server 40.

1.2.4 Print Server

Figure 5:
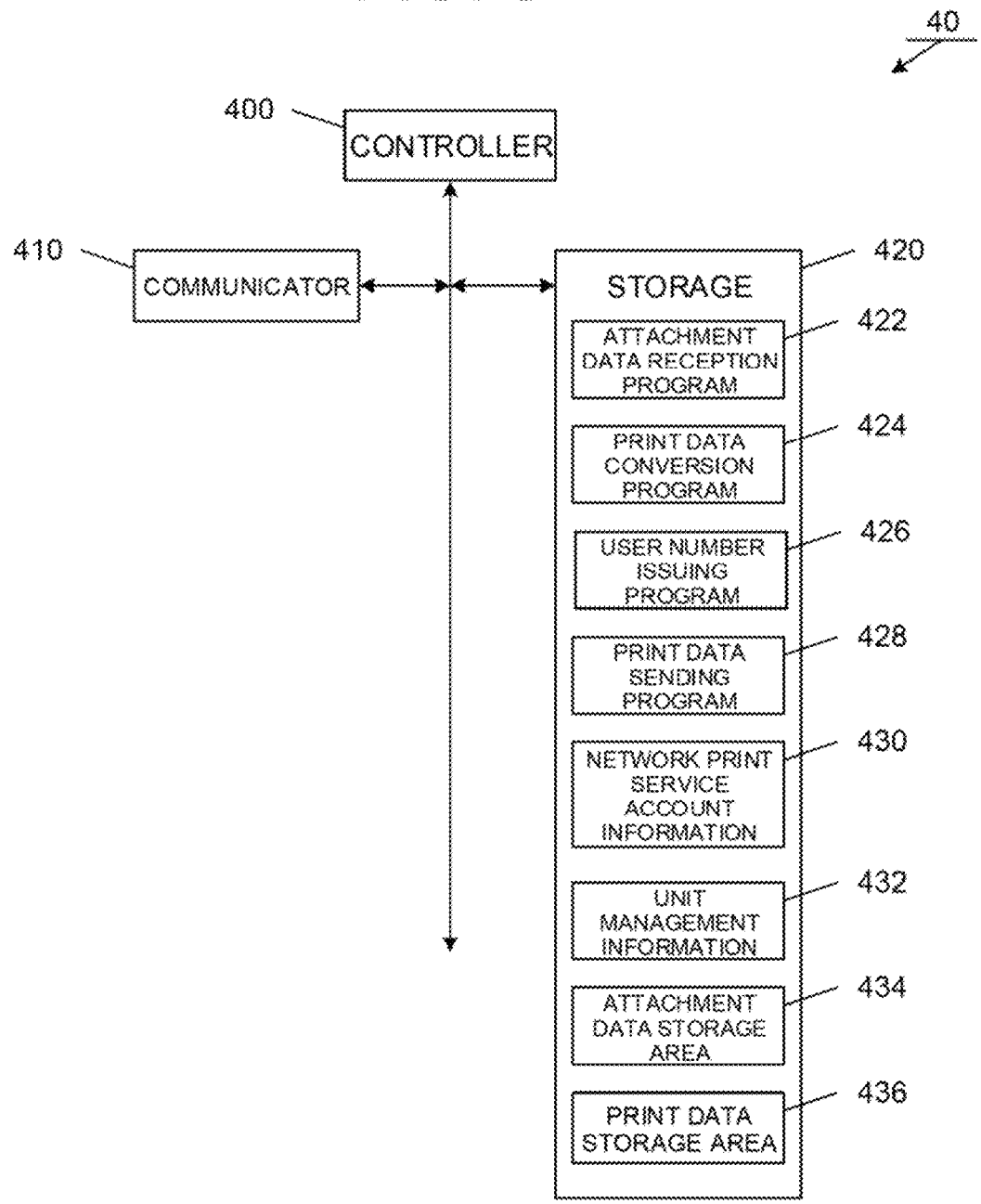
FIG. 5 is a diagram for illustrating a functional configuration of a print server in the first embodiment.

A description will be made on a functional configuration of the print server 40 with reference to FIG. 5. As illustrated in FIG. 5, the print server 40 includes a controller 400, a communicator 410, and a storage 420.

The controller 400 is a function device for controlling the entire print server 40. The controller 400 reads and runs various programs to realize various functions, and includes one or multiple arithmetic devices (for example, the CPUs).

The communicator 410 is a function device for the print server 40 to communicate with the external equipment. For example, the communicator 410 includes the NIC used in the wired/wireless LAN and a communication module that can be connected to the LTE/LTE-A/LAA/5G line.

The storage 420 is a function device that stores the various programs required for operation of the print server 40 and various data. The storage 420 includes the SSD, the HDD, or the like as the semiconductor memory, for example.

The storage 420 stores an attachment data reception program 422, a print data conversion program 424, a user number issuing program 426, a print data sending program 428, network print service account information 430, and unit management information 432. In addition, an attachment data storage area 434 that is an area for storing the attachment data and a print data storage area 436 that is an area for storing the print data are secured in the storage 420.

The attachment data reception program 422 is a program that receives the attachment data sent from the relay server 30. The attachment data reception program 422 stores the received attachment data in the attachment data storage area 434.

The print data conversion program 424 is a program for converting the attachment data that cannot be read by the image forming apparatus 50 to data that can be read by the image forming apparatus 50, and outputs such data as the print data. For example, in the case where the attachment data is the document data, the print data conversion program 424 outputs data, which is converted to data in a format capable of being printed (output) by the image forming apparatus 50, as the print data. The printable format is the image data per page, for example. The image data per page may be compressed to single data, PDL data, or data storing a print command. In the case where the attachment data is the image data, and the image data cannot be read by the image forming apparatus 50, the image data may be output as the print data by processing to compress the data, change the data format, change resolution, sharpen the image, change a color mode, or the like.

The user number issuing program 426 is a program that issues the user number associated with the print data. The user number issuing program 426 may issue one user number for each piece of the attachment data, or may issue one user number for multiple pieces of the attachment data. That is, the user number issuing program 426 only needs to associate the user number with the print data that is stored on the basis of the attachment data.

The print data sending program 428 is a program that reads the print data associated with the received user number from the print data storage area 436 and sends the print data to the image forming apparatus 50 in the case where the user number is sent from the image forming apparatus 50.

The network print service account information 430 is the information on the account of the user who uses the network print service. For example, the network print service account information 430 stores the account name and the password of the user who uses the network print service. Here, the information on the account of the user who uses the network print service and the information on the account of the user who uses a communication service are different information.

The unit management information 432 is information on the image forming apparatus 50 that prints out the print data. For example, the unit management information 432 stores unit information, such as a serial number and a series name of the image forming apparatus 50, and information used to identify the image forming apparatus 50 such as the IP address. In addition, the unit management information 432 may store an address of a placement location and a name of a placement store.

1.2.5 Image Forming Apparatus

Figure 6:
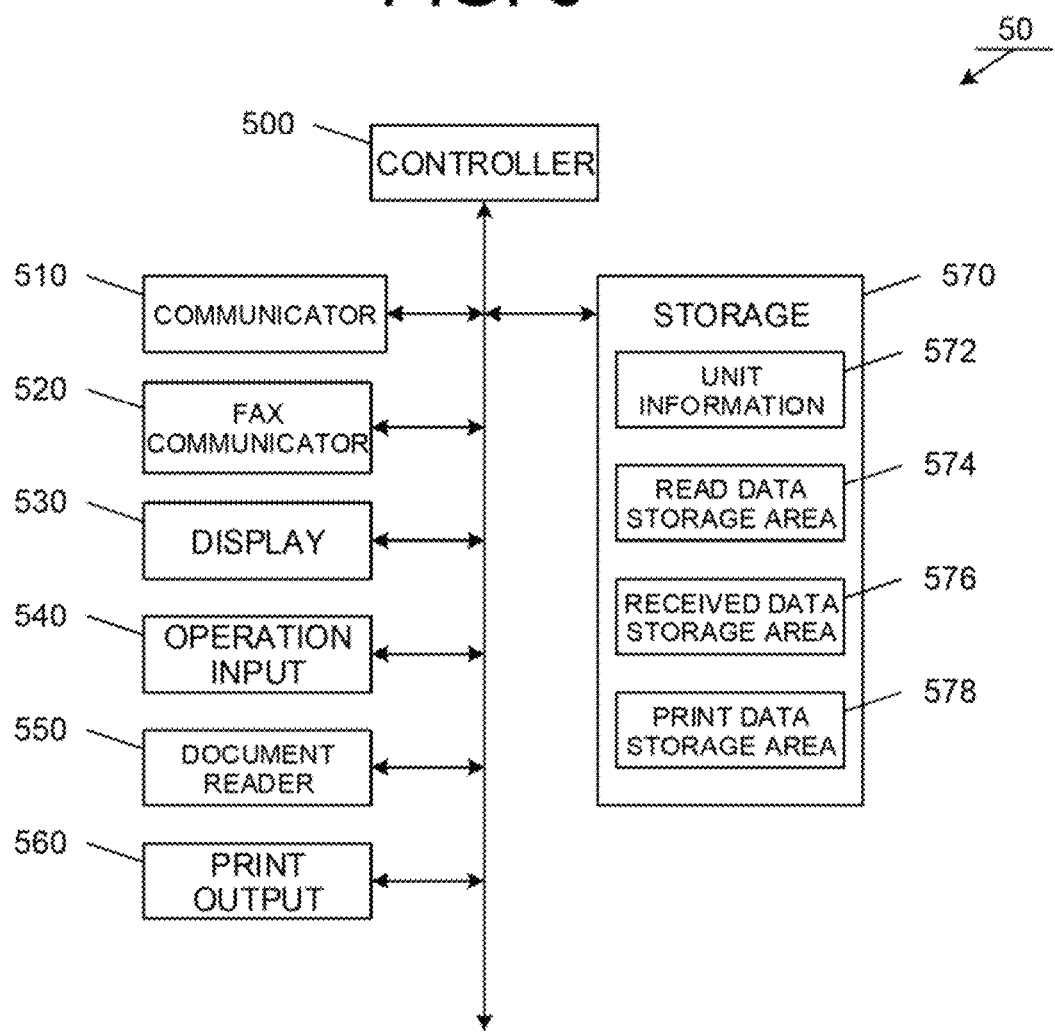
FIG. 6 is a diagram for illustrating a functional configuration of an image forming apparatus in the first embodiment.

A description will be made on a functional configuration of the image forming apparatus 50 with reference to FIG. 6. As illustrated in FIG. 6, the image forming apparatus 50 includes a controller 500, a communicator 510, a FAX communicator 520, the display 530, an operation input 540, a document reader 550, a print output 560, and a storage 570.

The controller 500 is a function device for controlling the entire image forming apparatus 50. The controller 500 reads and runs various programs to realize various functions, and includes one or multiple arithmetic devices (for example, the CPUs).

The communicator 510 is a function device for the image forming apparatus 50 to communicate with the external equipment. For example, the communicator 510 includes the NIC used in the wired/wireless LAN and a communication module that can be connected to the LTE/LTE-A/LAA/5G line. In this embodiment, the communicator 510 is connected to the print server 40 and receives the print data from the print server 40.

The FAX communicator 520 is a function device for communicating with an image transmission system that sends and receives the image data via a public switched telephone network or an Internet Protocol (IP) communication network. In this embodiment, the image data that is received by the FAX communicator 520 will be referred to as received data.

The display 530 is a function device for displaying various information to the user, and includes the LCD and the like, for example. The operation input 540 is a function device for accepting the operation instruction from the user, and includes various key switches, a device that detects input by contact, and the like. The user inputs a function to be used and an output condition via the operation input 540. The image forming apparatus 50 may include a touchscreen in which the display 530 and the operation input 540 are integrally formed. In this case, the method for detecting the input on the touchscreen only needs to be the general detection method such as the resistance film method, the infrared method, the electromagnetic induction method, or the capacitance method.

The document reader 550 is a function device for reading the image data input to the image forming apparatus 50. For example, the document reader 550 is connected to a document reading device such as a scanner, and receives the image data that is output from the document reading device. Alternatively; the document reader 550 may receive the image data from a storage medium such as Universal Serial Bus (USB) or an SD card. In this embodiment, the image data read by the document reader 550 will be referred to as read data.

The print output 560 is a function device for forming (printing) the print data, the received data, or the read data on the recording medium (for example, recording paper). For example, the print output 560 includes a laser printer using an electrophotographic method, or the like.

The storage 570 is a function device that stores the various programs required for operation of the image forming apparatus 50 and various data. The storage 570 includes the SSD, the HDD, or the like as the semiconductor memory, for example.

The storage 570 stores unit information 572. The unit information 572 is information unique to the image forming apparatus 50, and is the serial number and the series name, for example. In addition, a read data storage area 574, which is an area for storing the read data, a received data storage area 576, which is an area for storing the received data, and a print data storage area 578, which is an area for storing the print data, are secured in the storage 570.

1.3 Processing Flow

1.3.1 Overview of Processing

Figure 7:
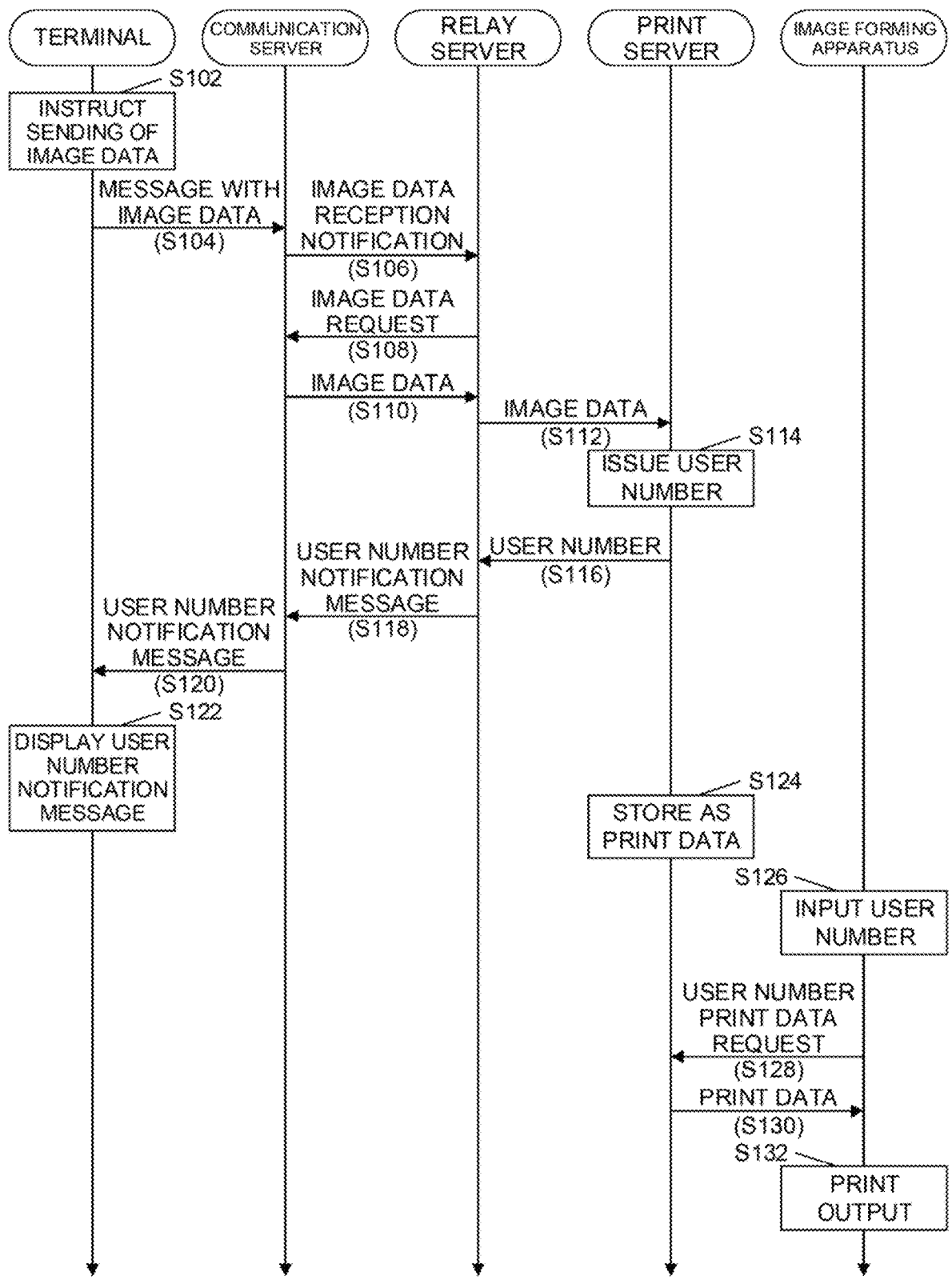
FIG. 7 is a sequence chart in the first embodiment.

A description will be made on an overview of processing in this embodiment with reference to FIG. 7 and FIG. 8. It is assumed that the user of the terminal 10 knows the account name for the relay server 30 in advance and that the message can be sent to the relay server 30. In addition, in this embodiment, a description will be made under the assumption that the attachment data is the image data, that the attachment data is sent separately from the message, and that the content of the message at the time of sending the attachment data is the message indicating the attachment data.

Figure 8:
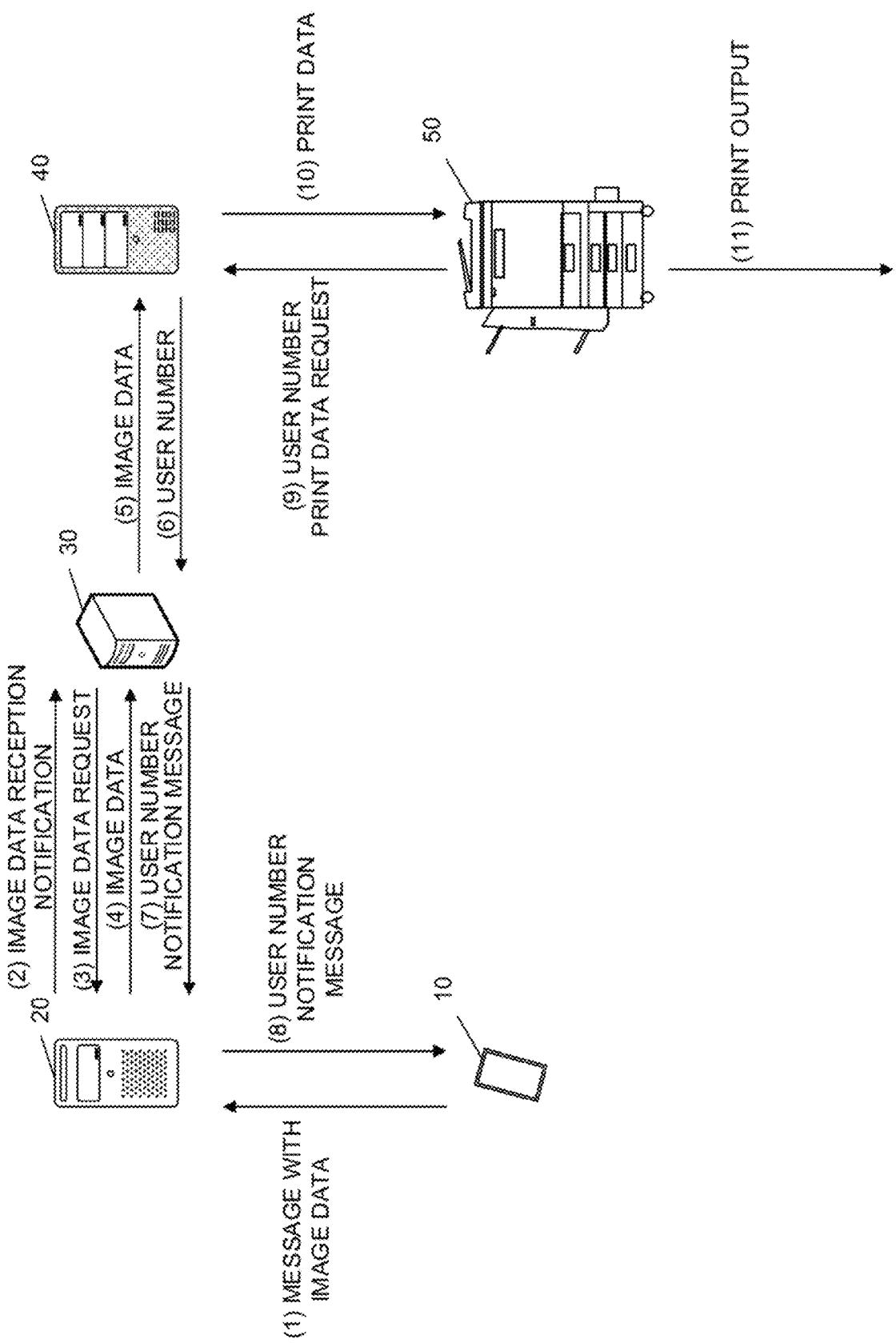
FIG. 8 is a sequence chart in the first embodiment.

First, in the case where the terminal 10 receives an instruction to send the image data to the relay server 30 from the user at the time of executing the messenger application (S102), the terminal 10 sends the message with the image data, for which the relay server 30 is set as the sending destination, to the communication server 20 (S104) (FIG. 8 (1)). The message with the image data is the message, the content of which indicates the attachment data, and is the message whose attachment data based on the message indicating the attachment data is the image data. When sending the message with the image data to the communication server 20, the terminal 10 reads the image data, which is set as a posting target by the user, from the image data storage area 158, and sends the image data to the communication server 20.

When receiving the message with the image data from the terminal 10, the communication server 20 stores the message with the image data in the message storage area 226. Meanwhile, when receiving the image data from the terminal 10, the communication server 20 stores the image data in the attachment data storage area 228. At this time, the content of the message indicating the attachment data may be rewritten to information on the location of the image data stored in the attachment data storage area 228. In this way, the device that has received the message with the image data can acquire the image data, which is stored in the attachment data storage area 228, on the basis of the location of the image data provided in the content of the message indicating the attachment data. Then, the communication server 20 sends an image data reception notification, which is a notification of the reception of the image data, to the relay server 30 (S106) (FIG. 8 (2)). The image data reception notification may include the message indicating the attachment data, the account name of the sending source of the message with the image data, and information that specifies the message (for example, a message ID or the like).

When receiving the image data reception notification, the relay server 30 sends an image data request, which requests the image data associated with the received image data reception notification, to the communication server 20 (S108) (FIG. 8 (3)). For example, the image data request may include the message indicating the attachment data and the message ID. Based on the information included in the image data request, the relay server 30, which has received the image data request, specifies and reads the requested image data from the image data stored in the attachment data storage area 228. Then, the communication server 20 sends the read image data to the relay server 30 (S110) (FIG. 8 (4)).

When receiving the image data, the relay server 30 sends the image data to the print server 40 (S112) (FIG. 8 (5)). The print server 40 stores the received image data in the attachment data storage area 434. At this time, the print server 40 issues the user number (S114), and sends the issued user number to the relay server 30 (S116) (FIG. 8 (6)).

The relay server 30, which has received the user number sets the terminal 10 as the sending destination and sends a user number notification message including the user number to the communication server 20 with (S118) (FIG. 8 (7)). The user number notification message is a message including the user number.

The communication server 20, which has received the user number notification message, sends the user number notification message to the terminal 10 as the sending destination (S120) (FIG. 8 (8)). The communication server 20 sends the user number notification message after receiving the message request sent from the terminal 10. Alternatively, before sending the user number notification message, the communication server 20 may notify the terminal 10 of the reception of the message. Then, the terminal 10, which has received the user number notification message, uses the messenger application to display the received user number notification message on the display 120 (S122). In this way, the user can know the user number.

The print server 40 stores the image data, which is relayed (sent) from the relay server 30, as the print data in the print data storage area 436 (S124). The image data is stored as is as the print data. In the case where the data size of the data is large, or the like, the print data in such size that is output by the function of the print data conversion program 424 may be stored.

The image forming apparatus 50 is acquires the user number by operation such as the input of the user number by the user (S126). For example, the image forming apparatus 50 displays a print service menu, in which a list of the services that can be used is displayed, on the display 530. In the case where the user selects "network print" from the print service menu, the image forming apparatus 50 displays a screen to enter the user number, so as to allow the user to input the user number. Then, once acquiring the user number, the image forming apparatus 50 adds the acquired user number to a print data request, which requests the print data, and sends the print data request to the print server 40 (S128) (FIG. 8 (9)).

The print server 40 reads the print data, which is specified by the user number included in the print data request, from the print data storage area 436, and sends the read print data to the image forming apparatus 50 (S130) (FIG. 8 (10)). The image forming apparatus 50, which has received the print data, performs printing on the basis of the print data and can thereby print out the print data (S132) (FIG. 8 (11)).

1.3.2 Processing of Terminal

Figure 9:
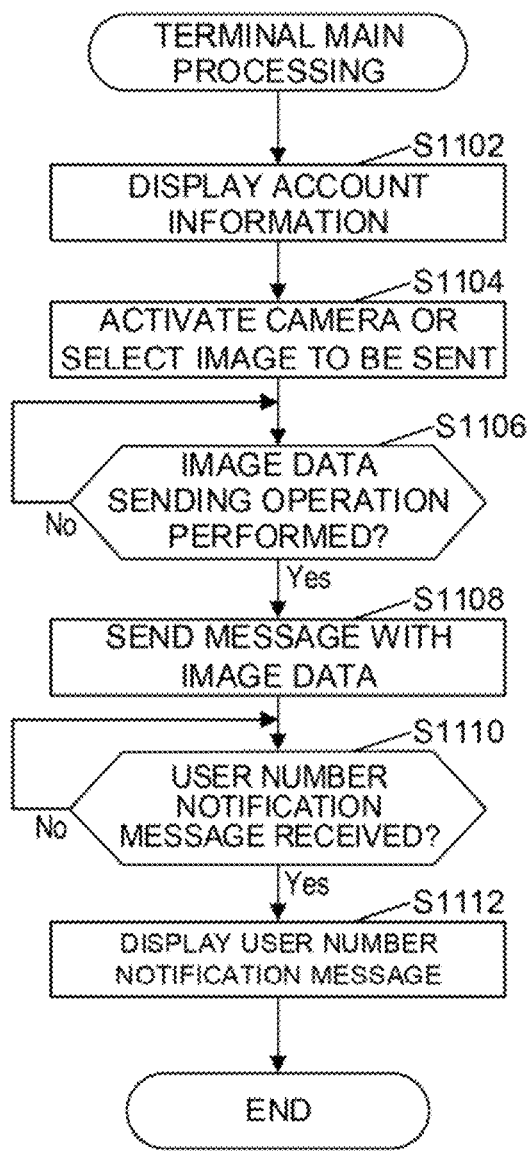
FIG. 9 is a flowchart for illustrating a flow of main processing of the terminal inn the first embodiment.

A description will be made on main processing of the terminal 10 with reference to FIG. 9. The main processing of the terminal 10 is executed when the controller 100 reads the message exchange program 152.

First, the controller 100 reads the account information stored in the account information storage area 154, and displays the list (Step S1102). When the user select a single piece of the account information, the controller 100 displays a screen, on which the message is exchanged with the user associated with the selected account information, on the display 120. In this embodiment, a description will be made under the assumption that the relay server 30 is selected as the user as the sending destination of the message.

Next, when the user performs an operation to activate the camera or an operation to send the image, the controller 100 executes processing to determine the image data to be the attachment data included in the message (S1104). For example, in the case where the operation to activate the camera is performed, the controller 100 activates a camera application that can be executed by the terminal 10, and sets the image data captured by the camera application as the image data as the attachment data. When an operation to select the image to be sent is performed, the controller 100 displays a list of the image data stored in the image data storage area 158, and sets the image data selected by the user as image data as the attachment data. Multiple pieces of the image data may be selected as the attachment data.

Next, the controller 100 determines whether an image data sending operation, which is an operation to send the message including the image data as the attachment data, is performed (Step S1106). If the image data sending operation is performed, the controller 100 sets the image data determined in Step S1104 as the attachment data, and generates the message with the image data, the sending destination of which is the account name for the relay server 30. Then, the controller 100 sends the generated message with the image data to the communication server 20 (Step S1108). At this time, the controller 100 sends the image data, which is determined in Step S1104, to the communication server 20. Here, the message indicating the attachment data includes a file name of the image data as the attachment data and attributes of the image data. In addition, the message indicating the attachment data is attachment data. The communication server 20 collates the image data sent from the terminal 10 with the message indicating the attachment data and can thereby determine whether the attachment data is normally sent.

Then, when the controller 100 receives the user number notification message, the sending source of which is set as the relay server 30, from the communication server 20 (Step S1110), the controller 100 displays the message, which is included in the user number notification message, on the display 120 (Step S1112).

1.3.3 Processing of Communication Server

Figure 10:
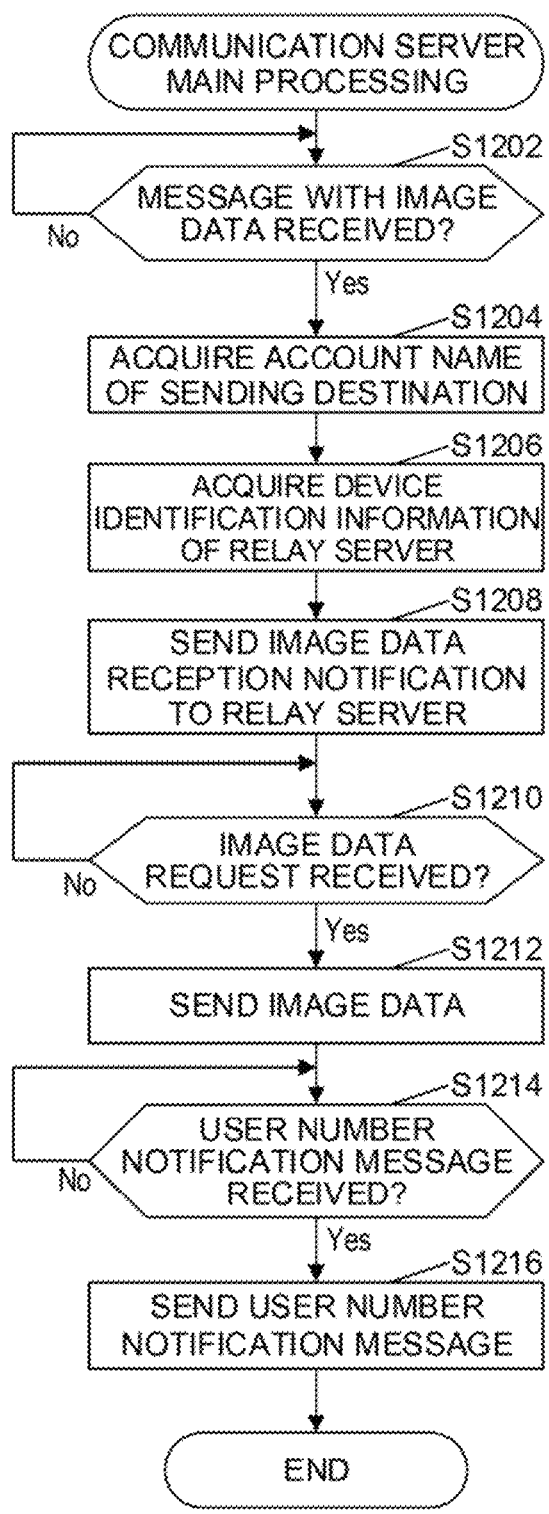
FIG. 10 is a flowchart for illustrating a flow of main processing of the communication server in the first embodiment.

A description will be made on main processing of the communication server 20 with reference to FIG. 10. First, the controller 200 determines whether the message with the image data is received from the terminal 10 (Step S1202). If the message with the image data is received (Step S1202; Yes), the controller 200 stores the received message with the image data in the message storage area 226. In addition, the controller 200 stores the image data, which is sent from the terminal 10, in the attachment data storage area 228.

Next, the processing in Step S1204 to Step S1208 is executed by the function of the message reception notification program 224. First, the controller 200 acquires the account name of the sending destination of the message with the image data (Step S1204). Then, the controller 200 acquires the device identification information associated with the account name from the account/terminal management information 222 (Step S1206). Thereafter, the controller 200 sends the image data reception notification to the relay server 30 on the basis of the acquired device identification information (Step S1208). For example, in the case where the IP address is included in the device identification information, the controller 200 sends the image data reception notification to the IP address that is stored as the device identification information.

Next, when receiving the image data request from the relay server 30, the controller 200 sends the image data on the basis of the image data request (Step S1210; Yes→Step S1212). Then, when receiving the user number notification message from the relay server 30, the controller 200 sends the user number notification message to the terminal 10 that is associated with the account name designated as the sending destination (Step S1214; Yes→Step S1216).

1.3.4 Processing of Relay Server

Figure 11:
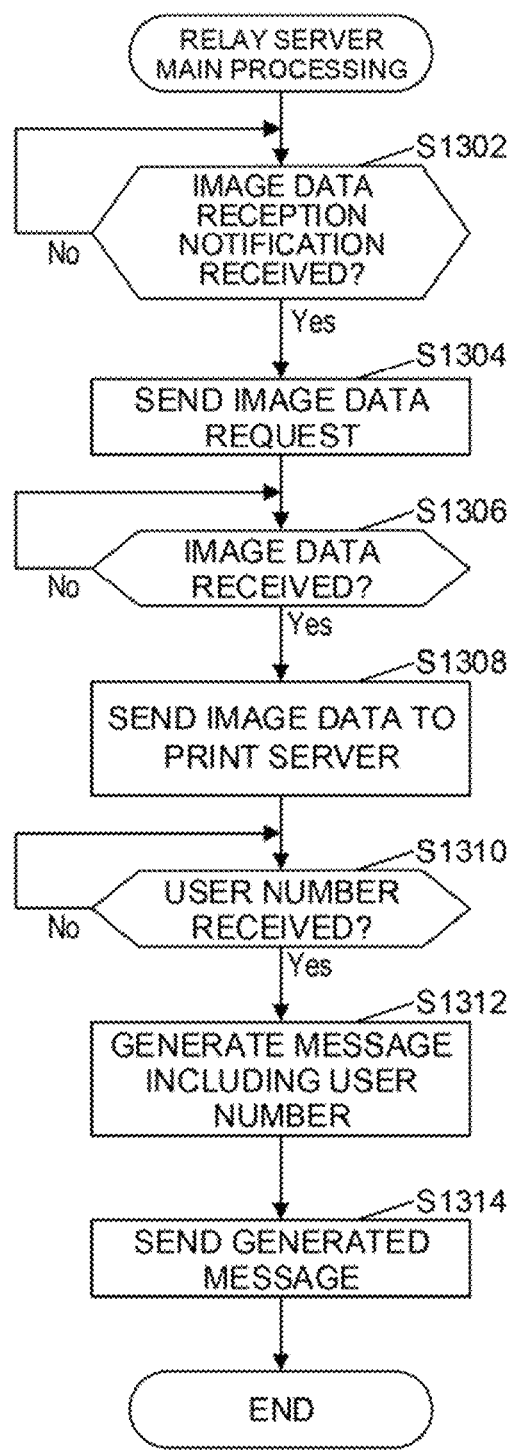
FIG. 11 is a flowchart for illustrating a flow of main processing of the relay server in the first embodiment.

A description will be made on main processing of the relay server 30 with reference to FIG. 11. First, the controller 300 determines whether the image data reception notification is received from the communication server 20 (Step S1302).

When the image data reception notification is received (Step S1302; Yes), the processing in Step S1304 to Step S1308 is executed by the function of the relay program 324. First, the controller 300 sends the image data to the communication server 20. (Step S1304) if the controller 300 receives the image data from the communication server 20 (Step S1306; Yes), the controller 300 stores the image data in the attachment data storage area 326. Then, the controller 300 sends the image data, which is stored in the attachment data storage area 326, to the print server 40 on the basis of the print server information 328 (Step S1308).

Next, the controller 300 determines whether the user number is received from the print server 40 (Step S1310). If the user number is received from the print server 40, the processing in Step S1312 to Step S1314 is executed by the function of the response program 322. First, the controller 300 generates the message that includes the user number (Step S1312). For example, the controller 300 generates the message that includes, in addition to the user number, a print-out method, rules of the network print service, an expiration date, and the like. Then, the controller 300 sets the account name of the sending source of the message with the image data as the sending destination, and sends the user number notification message, which includes the message including the user number, to the communication server 20 (Step S1314).

1.3.5 Processing of Print Server

Figure 12:
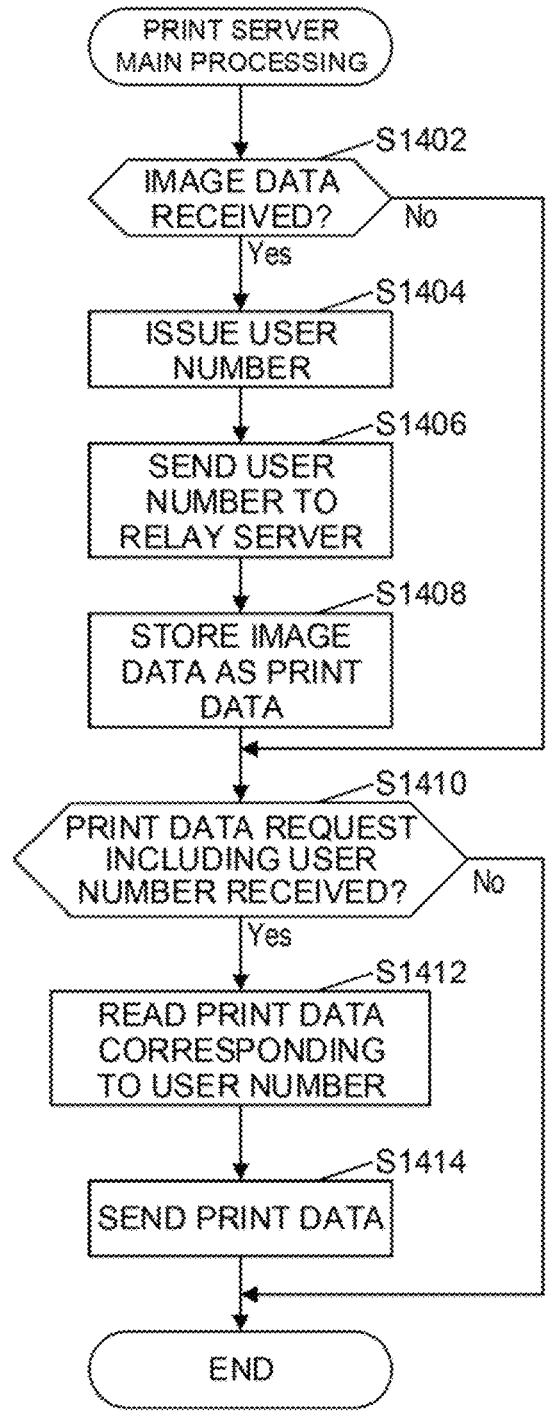
FIG. 12 is a flowchart for illustrating a flow of main processing of the print server in the first embodiment.

A description will be made on main processing of the print server 40 with reference to FIG. 12. First, the controller 400 determines whether the image data is received from the relay server 30 (Step S1402). If the image data is received (Step S1402; Yes), the controller 400 stores the received image data in the attachment data storage area 434.

Next, the controller 400 issues the user number that is associated with the print data by the function of the user number issuing program 426 (Step S1404). Then, the controller 400 sends the issued user number to the relay server 30 (Step S1406). In addition, the controller 400 stores the image data as the print data in the print data storage area 436 (Step S1408). The controller 400 may store the print data that is output by the function of the print data conversion program 424 in the print data storage area 436.

Next, the controller 400 determines whether the print data request including the user number is received from the image forming apparatus 50 (Step S1410). The print data request is the request of the print data that is sent from the image forming apparatus 50 to the print server 40. The multiple user numbers may be included in the print data request. If the print data request is received (Step S1410; Yes), the processing in Step S1410 to Step S1412 is executed by the function of the print data sending program 428. First, the controller 400 reads the print data, which is associated with the user number included in the print data request, from the print data storage area 436 (Step S1412). Then, the controller 400 sends the read print data to the image forming apparatus 50 that is the sending source of the print data request (Step S1414).

1.3.6 Processing of Image Forming Apparatus

Figure 13:
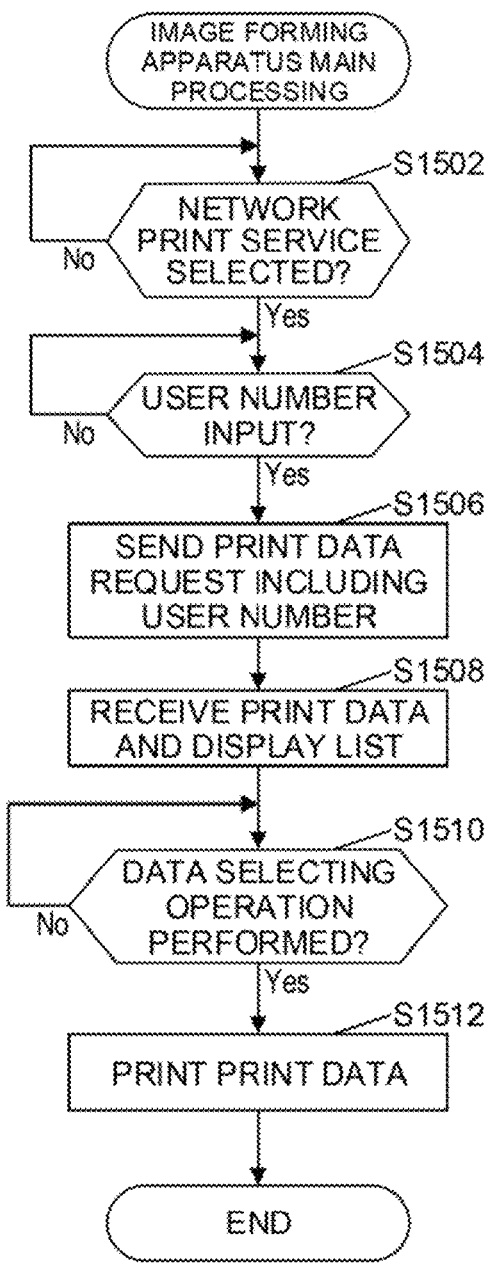
FIG. 13 is a flowchart for illustrating a flow of main processing of the image forming apparatus in the first embodiment.

A description will be made on main processing of the image forming apparatus 50 with reference to FIG. 13. First, the controller 500 determines whether the user selects the use of the network print service (Step S1502). For example, the controller 500 determines that the user has selected the use of the network print service when the user selects the "network print" from the print service menu displayed on the display 530. When the network print service is selected as the service used by the user, the controller 500 next determines whether the user inputs the user number (Step S1502; Yes→Step S1504).

When the user number is input, the controller 500 acquires the input user number and sends the print data request, which includes the acquired user number, to the print server 40 (Step S1504; Yes→Step S1506). Then, when receiving the print data from the print server 40, the controller 500 displays the received print data in a list on the display 530 (Step S1508).

Next, if the user performs a data selection operation to select one or multiple pieces of the print data from the listed print data (Step S1510; Yes), the controller 500 prints the selected print data (Step S1512). When the print data is displayed in the list, the controller 500 may be able to select the number of copies to be printed per the print data, or may be able to select size and a type of the print paper on the basis of the print data.

1.4 Operation Example

Figure 14:
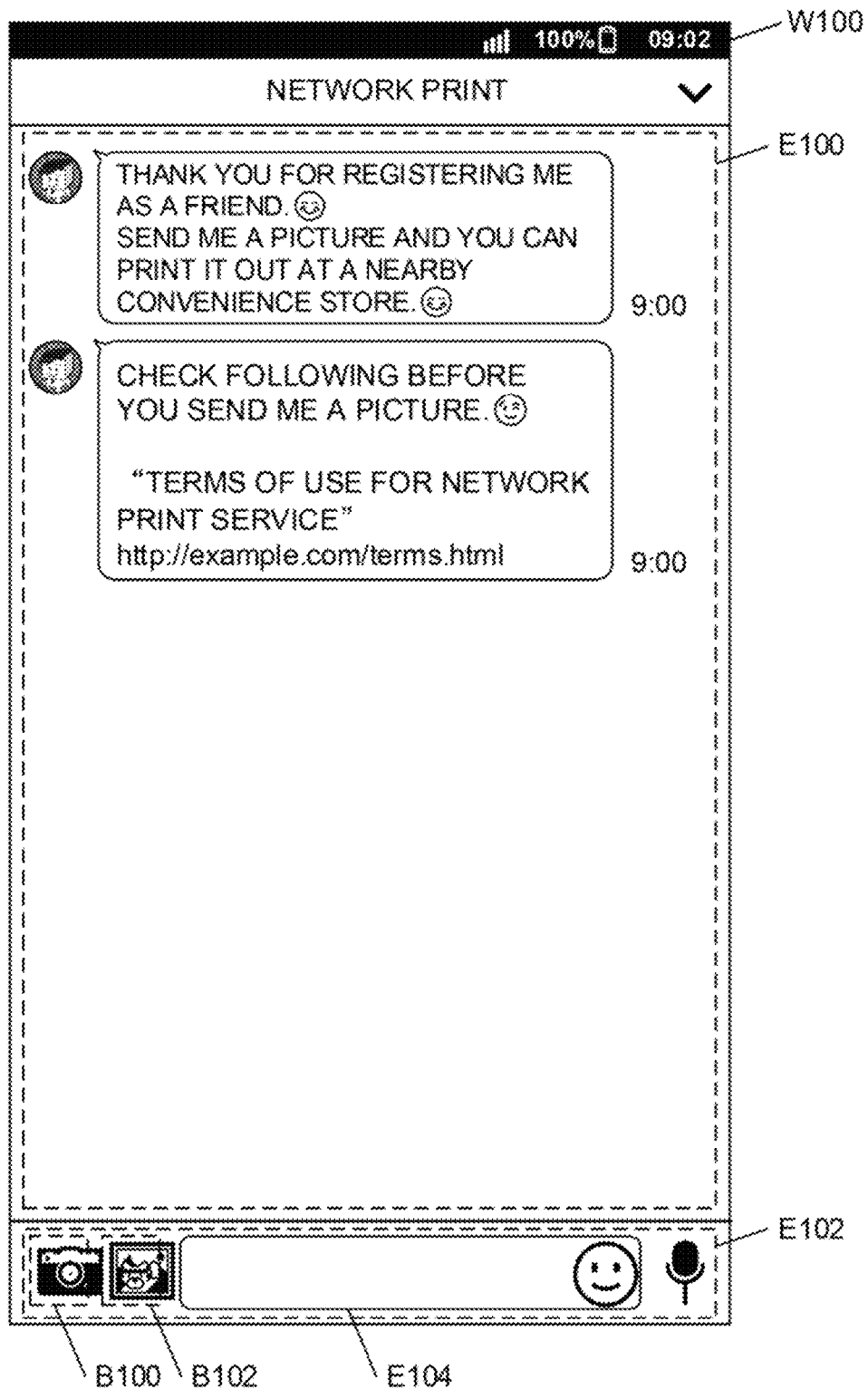
FIG. 14 is a view of an operation example in the first embodiment.

Next, a description will be made on an operation example with reference to the drawings. FIG. 14 is a view illustrating an example of a display screen W100 that is displayed on the display 120 when the controller 100 runs the message exchange program 152. The display screen W100 includes an area E100 for displaying the timeline and an area E102 for inputting and sending the messages.

In the area E100 for displaying the timeline, the content of the message and the sent date and time are displayed per the message stored in the message storage area 156. In the example of FIG. 14, the message is displayed in the balloon, and an icon indicating the user who has sent the message is displayed next to the balloon. With such display, the message may be displayed in a manner to facilitate understanding.

In the area E102, a button B100 used to activate the camera application, a button B102 used to select the image data stored in the image data storage area 158, and an area E104 to input the text are provided. By selecting the button B100 or the button B102, the user can use the image data as the message.

FIG. 14 also illustrates an example in which the messages (for example, "THANK YOU FOR REGISTERING ME AS A FRIEND" and "CHECK FOLLOWING BEFORE YOU SEND ME A PICTURE") sent from the relay server 30 at the time when the user of the terminal 10 adds the relay server 30 as the sending destination of the message are displayed. Just as described, the relay server 30 may send the message, which notifies of the user of the terminal 10 that the image data can be sent to the network print service, to the user of the terminal 10 in advance.

Figure 15:
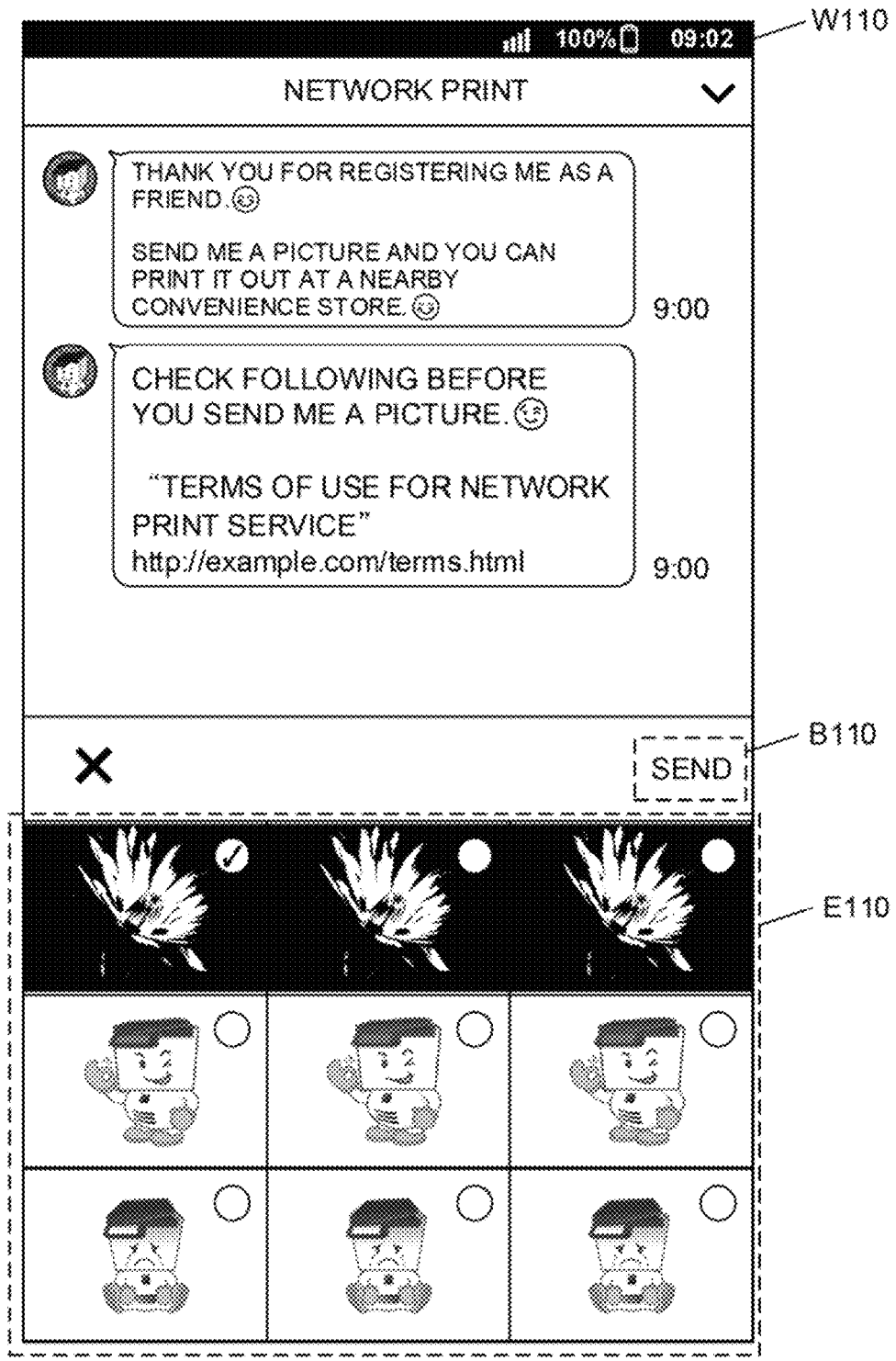
FIG. 15 is a view of an operation example in the first embodiment.

FIG. 15 is a view illustrating an example of a display screen WHO that is displayed on the display 120 when the button B102 is selected. In a lower portion of the display screen W110, an area E110 for displaying thumbnails of the image data stored in the image data storage area 158 is provided. When the user selects any of the thumbnails selected inn the area E110, identification display is generated to indicate that the thumbnail is selected. For example, in the example of FIG. 15, a check mark is displayed at an upper right corner of the thumbnail, so as to indicate that the image data corresponding to the thumbnail with the displayed check mark is selected. Then, when the user selects a send bottom B110 used to send the selected image data, the terminal 10 sends the message with the image data, which includes the image data with the relay server 30 being selected as the sending destination, to the communication server 20.

Figure 16:
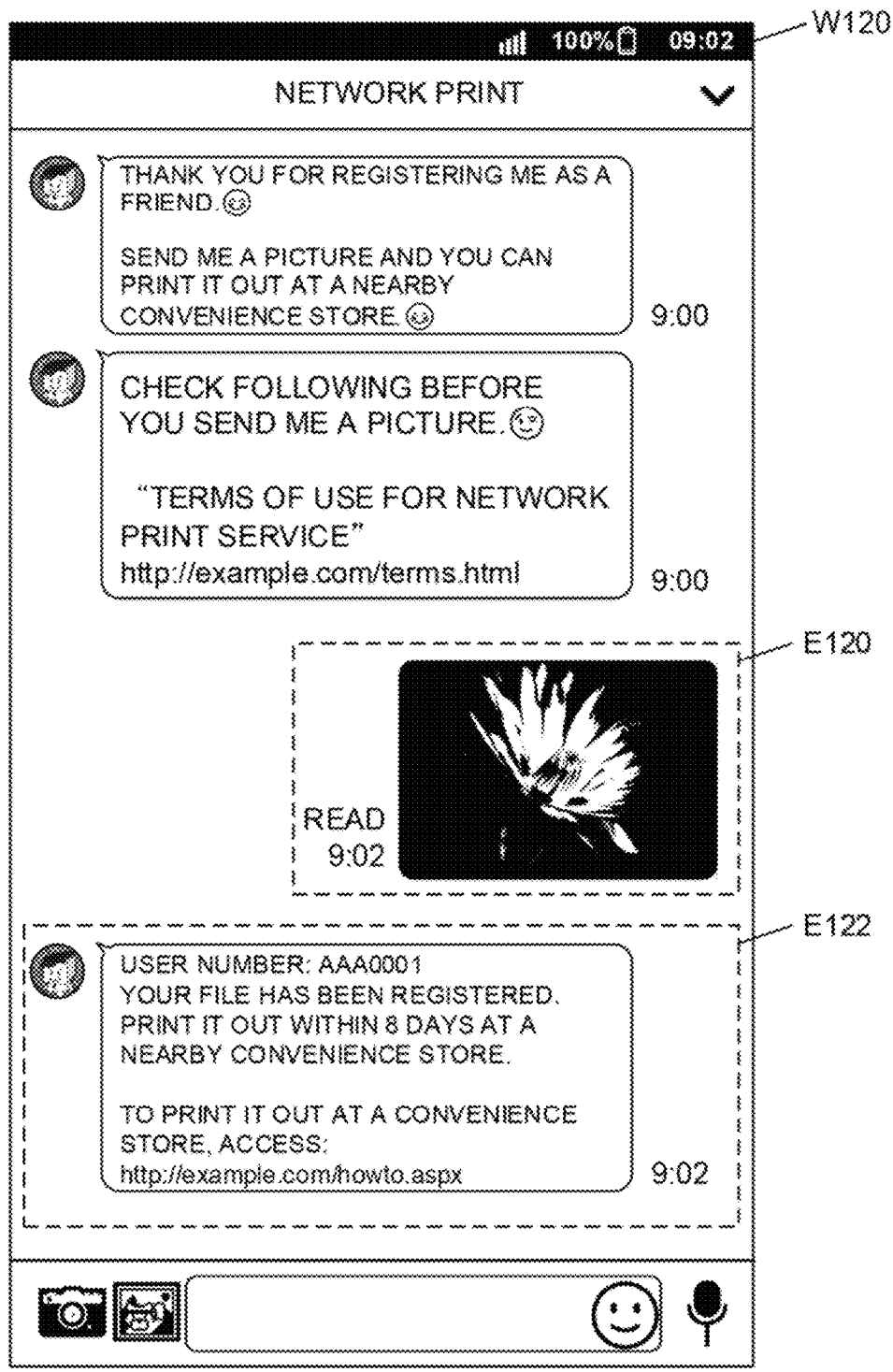
FIG. 16 is a view of an operation example in the first embodiment.

FIG. 16 is a view illustrating an example of a display screen W120 that is displayed on the display 120 when the relay server 30 receives the image data. As illustrated in FIG. 16, in the area for displaying the timeline, an area E120 for displaying the image data that is selected by the user and sent to the relay server 30 and an area E122 for displaying the user number notification message are provided. When inputting the user number, which is displayed in the area E122, to the image forming apparatus 50, the user can output the selected image data from the image forming apparatus 50.

According to this embodiment, the user can use the network print service by using the communication service. Thus, the user can register the image data in the print service without taking extra time to newly perform the membership registration or the like for the use of the network print service. In addition, the image data can be printed out from the image forming apparatus that is placed in the convenience store of the like.

In addition, since the relay server 30 makes the dialog with the terminal 10, it is possible to check from which account the image data is sent. Accordingly, the sending source of the image data can be grasped without the membership registration for the network print service. Understanding the sending source of the image data leads to suppression of registration and printing an illegal image, which improves security.

In addition, since the message can be exchanged between the terminal 10 and the relay server 30, the various types of the information can be subjected to PUSH distribution to each of the users at timing other than timing of printing. For example, the relay server 30 can distribute notification information such as maintenance information to each of the users, and can notify the user when end of a storage period (for example, eight days) of the image registered in the print server approaches. In this way, it is possible to promote the use of the network print system 1 to the user.

2. Second Embodiment

Next, a description will be made on a second embodiment. Differing from the first embodiment, the second embodiment is an embodiment in which data other than the image data can be output from the image forming apparatus 50 and in which the user is inquired about whether to output the data from the image forming apparatus 50.

In this embodiment, FIG. 2, FIG. 7, FIG. 9, FIG. 10, FIG. 11, and FIG. 12 in the first embodiment are respectively replaced with FIG. 17, FIG. 18, FIG. 19, FIG. 20, FIG. 21, and FIG. 22. Note that the same function device and the processing will be denoted by the same reference signs, and the description thereon will not be made.

2.1 Functional Configuration of Terminal

Figure 17:
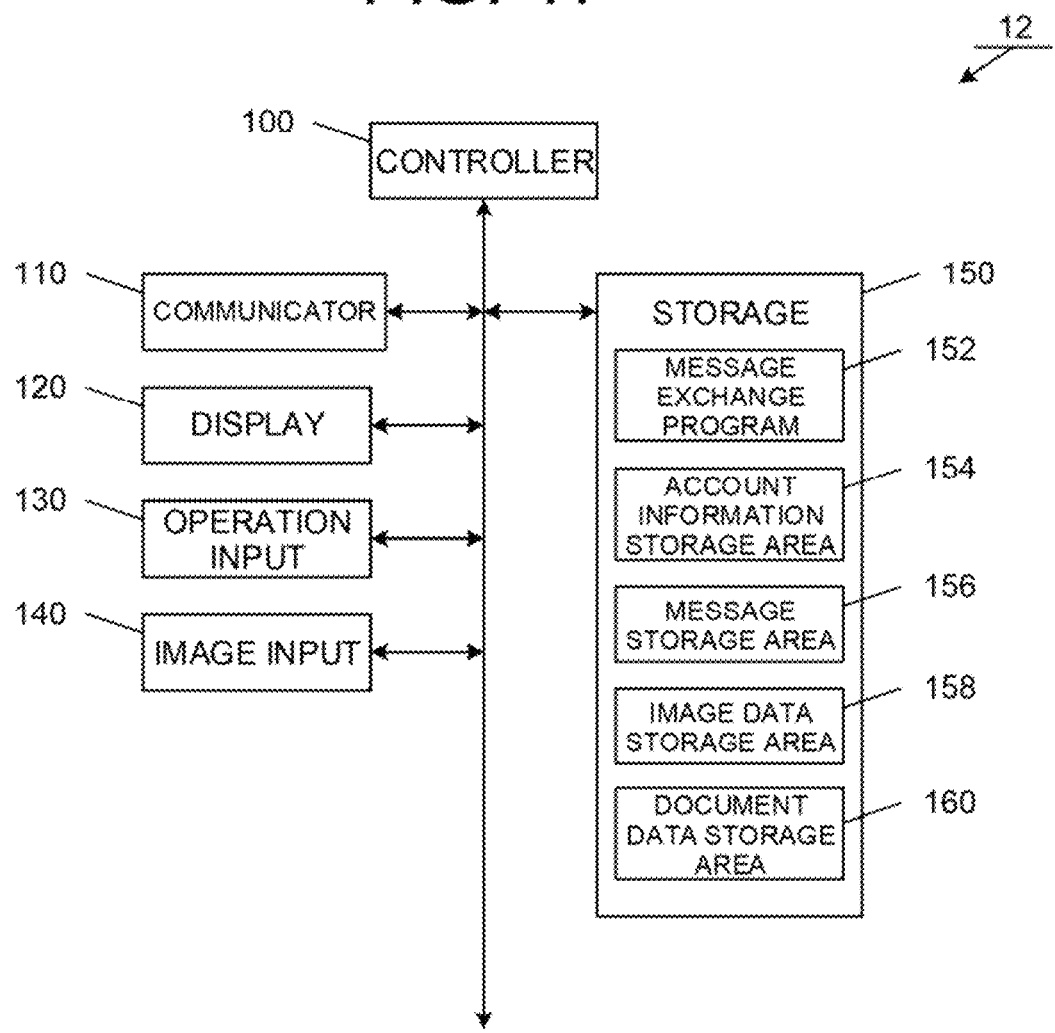
FIG. 17 is a diagram for illustrating a functional configuration of a terminal in a second embodiment.

A description will be made on a functional configuration of a terminal 12 with reference to FIG. 17. As illustrated in FIG. 17, the terminal 12 differs from the terminal 10 in a point that a document data storage area 160 is further secured in the storage 150. The document data storage area 160 is an area for storing the document data. The document data that is stored in the document data storage area 160 may be created in the terminal 12, or the document data that is created by the external device may be received via the communicable method 110. The document data is stored as the document file in the document data storage area 160, for example. The individual document data only has to be stored in the identifiable format, and may be stored in the database format, for example.

2.2 Processing Flow

2.2.1 Overview of Processing

Figure 18:
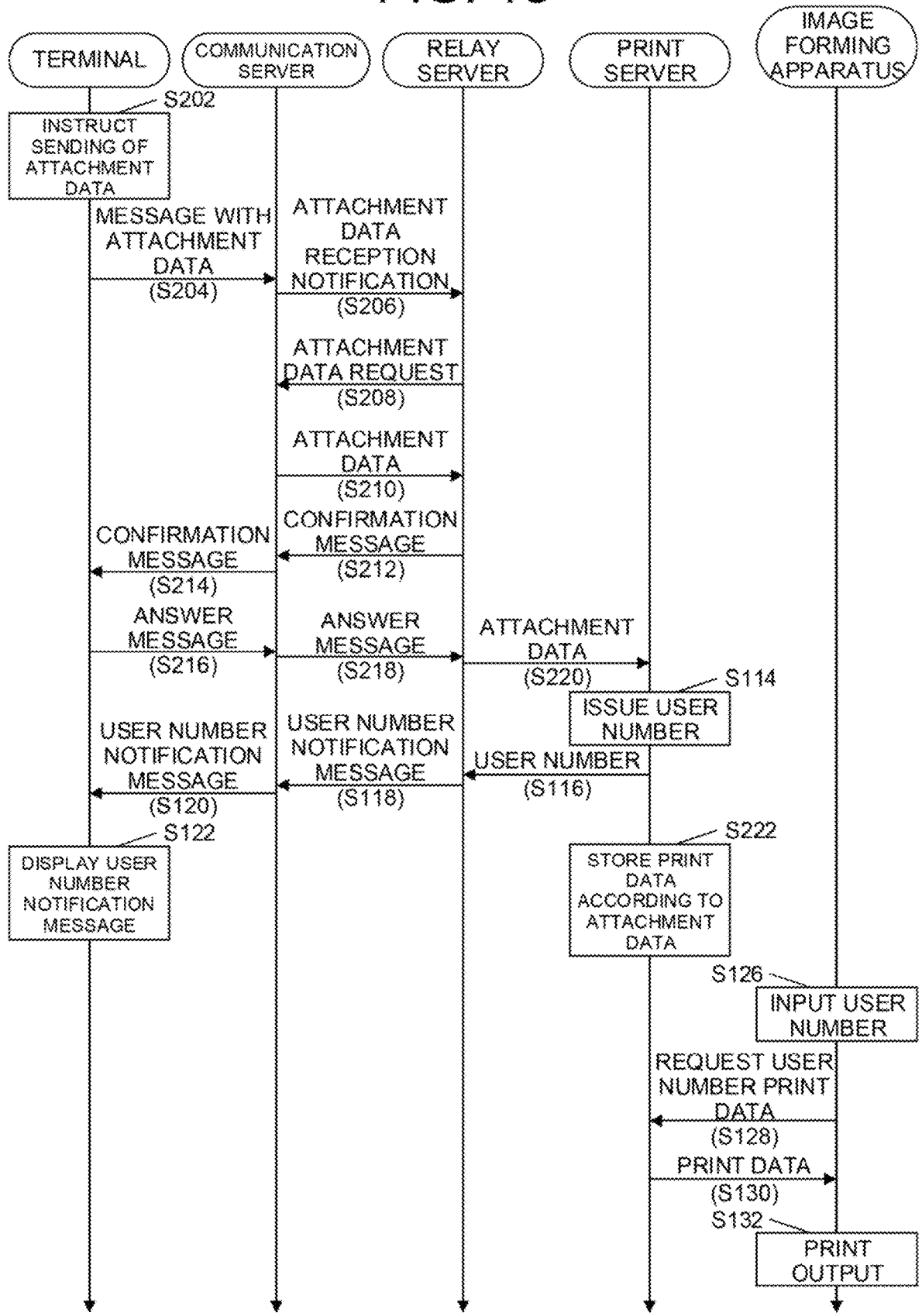
FIG. 18 is a sequence chart in the second embodiment.

A description will be made on overview of a flow of processing in this embodiment with reference to FIG. 18. First, in the case where the terminal 12 receives an instruction to send the attachment data to the relay server 30 from the user at the time of executing the messenger application (S202), the terminal 12 sends the message with the attachment data to the communication server 20 (S204). The message with the attachment data is the message, the content of which indicates the attachment data. Here, the controller 100 reads the data, sending of which is instructed by the user, from the image data storage area 158 or the document data storage area 160 on the basis of the data type, and sends the data to the communication server 20.

When receiving the message with the attachment data from the terminal 12, the communication server 20 stores the message with the attachment data in the message storage area 226. Meanwhile, when receiving the attachment data from the terminal 12, the communication server 20 stores the attachment data in the attachment data storage area 228. At this time, the content of the message indicating the attachment data may be rewritten to the information on the location of the attachment data stored in the attachment data storage area 228. In this way, the device that has received the message with the attachment data can acquire the attachment data, which is stored in the attachment data storage area 228, on the basis of the location of the attachment data provided in the content of the message indicating the attachment data. Then, the communication server 20 sends an attachment data reception notification, which is a notification of the reception of the attachment data, to the relay server 30 (S206). Similar to the first embodiment, the attachment data reception notification may include the message indicating the attachment data and the information that specifies the message.

When receiving the attachment data reception notification, the relay server 30 sends an attachment data request, which requests the attachment data associated with the received attachment data reception notification, to the communication server 20 (S208). Similar to the first embodiment, the attachment data request may include the message indicating the attachment data and the information that specifies the message. Based on the information included in the attachment data request, the communication server 20 specifies and reads the attachment data. Then, the communication server 20 sends the read attachment data to the relay server 30 (S210).

Next, the relay server 30 sends a confirmation message, the sending destination of which is the terminal 12, to the communication server 20 (S212). The confirmation message is a message that has a content of inquiring the user about whether to permit sending of the attachment data to the print server 40. The confirmation message may be a message that displays a choice between a positive response and a negative response. The communication server 20 that has received the confirmation message sends the confirmation message to the terminal 12 as the sending destination (S214).

When the user performs an operation to respond to the confirmation message, the terminal 12 sends an answer message, the sending destination of which is the relay server 30, to the communication server 20 (S216). The answer message is a message that has a content of the response to the confirmation message. The answer message may be information on a choice selected by the user, or may be the text data such as "Yes", "Please", "Sure", "No", "No Way". That is, the answer message only has to be data, with which it is possible to judge whether to permit sending of the attachment data to the print server 40. The communication server 20 that has received the answer message sends the answer message to the relay server 30 that is the sending destination (S218).

The relay server 30 determines whether the content of the answer message is a content that permits sending of the attachment data to the print server 40. Then, in the case where the content of the answer message is the content that permits sending of the attachment data to the print server 40, the relay server 30 sends the attachment data to the print server 40 (S220). Thereafter, the print server 40 stores the received attachment data in t the attachment data storage area 434, and issues the user number (S114). The processing in S116 to S122 is the same as that in the first embodiment.

The print server 40 stores the print data according to the attachment data that is relayed (sent) from the relay server 30 (S222). In the case where the attachment data is the image data, the print server 40 stores, as the print data, the image data as is. Alternatively, in the case where the attachment data is the document data, the print server 40 stores the data, the format of which is converted to the printable format by the image forming apparatus 50, as the print data. The processing in S126 to S136 is the same as that in the first embodiment.

2.2.2 Processing of Terminal

Figure 19:
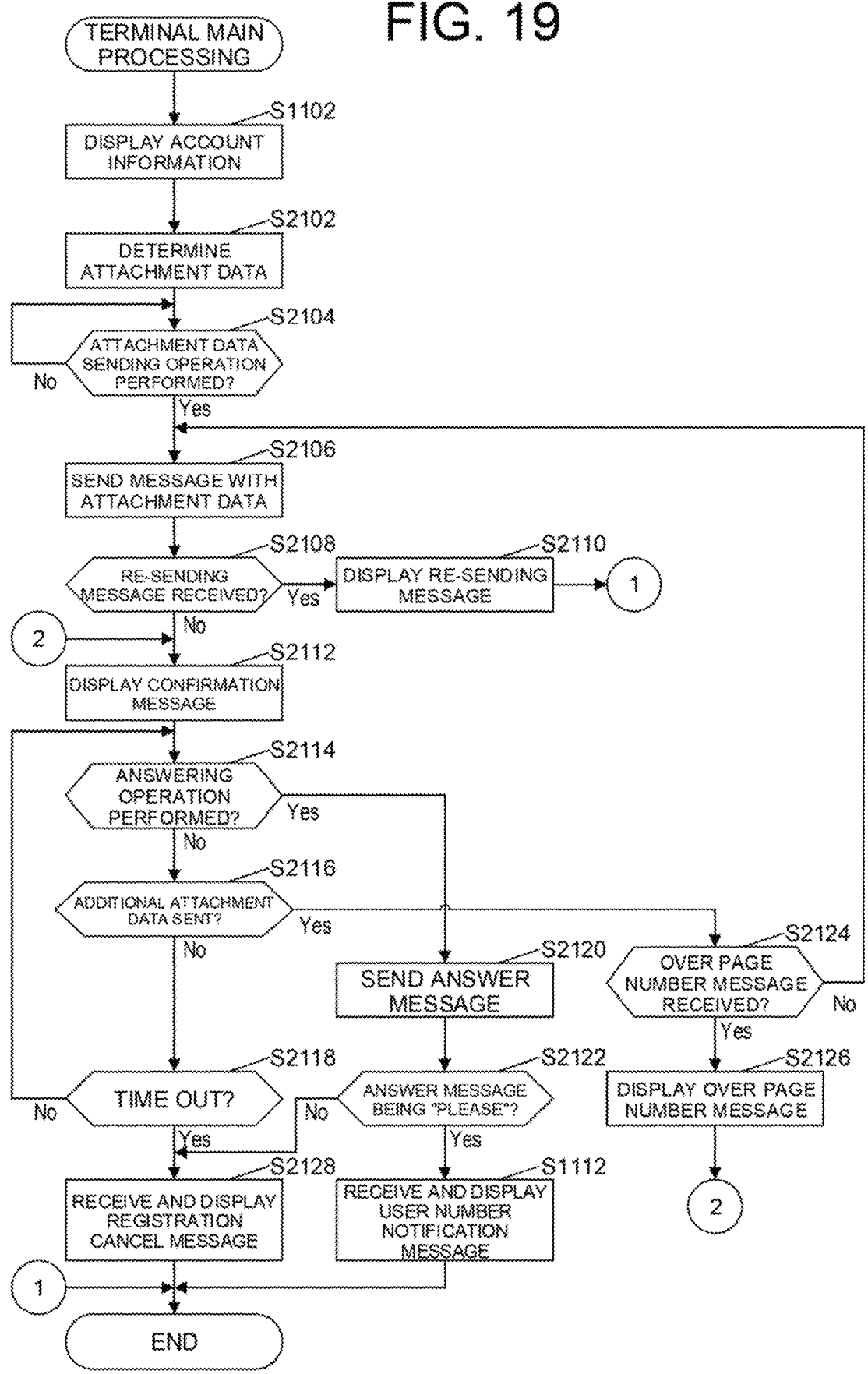
FIG. 19 is a flowchart for illustrating a flow of main processing of the terminal in the second embodiment.

A description will be made on the processing of the terminal 12 with reference to FIG. 19. The main processing of the terminal 12 is executed when the controller 100 reads the message exchange program 152.

First, the controller 100 reads the account information stored in the account information storage area 154 and displays the account information in the list for the selection of the sending destination of the message (Step S1102). In this embodiment, a description will be made under the assumption that the account information for the relay server 30 is selected as the sending destination of the message.

Next, the controller 100 determines the attachment data to be included in the message (Step S2102). For example, as a method for determining the attachment data, the controller 100 displays the list of the data stored in the image data storage area 158 and the document data storage area 160, and determines the data selected by the user as the attachment data. In the case where the operation to activate the camera application is performed, the controller 100 determines the image data captured by the activated camera application as the attachment data.

Next, the controller 100 determines whether an attachment data sending operation, which is an operation to send the message including the attachment data, is performed (Step S2104). If the attachment data sending operation is performed, the controller 100 generates the message indicating the attachment data determined in Step S2104. Then, the controller 100 sets the generated message indicating the attachment data as the message, and sends the message with the attachment data, the sending destination is the relay server 30, to the communication server 20. (Step S2106). At this time, the controller 100 sends the attachment data, which is determined in Step S2104, to the communication server 20.

Next, the controller 100 determines whether a re-sending message is received. If the re-sending message is received, the controller 100 displays the received re-sending message (Step S2108; Yes→Step S2110). The re-sending message is a message that has a content of prompting re-sending of the attachment data in the case where the attachment data that cannot be registered in the network print system 1 is sent, such as a case where the format of the attachment data is not supported. The case where the format of the attachment data is not supported is a case where the print data conversion program 424 cannot output the attachment data as the print data. Examples of such a case are that the attachment data is in the format that cannot be handled (read) by the print data conversion program 424, that the data size of the attachment data is too large, and that the data is corrupted.

Also in the case where the attachment data that cannot appropriately be printed out by the image forming apparatus 50 is sent, the re-sending message may be displayed on the terminal 12 as the case where the attachment data that cannot be registered in the network print system 1 is sent. For example, in the case where the image size of the image data, which is sent as the attachment data, is too small, or in the case where the number of the pages of the document data, which is sent as the attachment data, exceeds the predetermined number of the pages that can be output, the attachment data is not supported. Also in the case where the network print service cannot accept the attachment data for the registration due to such a reason that the network print service provided the print server 40 currently undergoes maintenance, the re-sending message may be displayed on the terminal 12. At this time, the re-sending message may include date and time at which the network print system 1 can accept the attachment data for the registration.

If the re-sending message is not received, the confirmation message is received and displayed (Step S2112). The controller 100 determines whether the user performs an answering operation that is an operation to answer to the confirmation message (Step S2114). The answer operation is an operation of the user to select an option or to respond by text. In the case where the user does not perform the answering operation to the confirmation message, then the controller 100 determines whether the user performs an operation to send the additional attachment data (Step S2114; No→Step S2116). If the operation to send the additional attachment data is not performed, the controller 100 determines whether timeout occurs (Step S2116; No→Step S2118). That is, the controller 100 continues determining whether the user performs the answering operation or the operation to send the additional attachment data until the timeout. The case where the timeout occurs is a case where a registration cancellation message, which will be described later, is received from the communication server 20, for example. Here, the controller 100 may measure elapsed time since the display of the confirmation message, and may determine that the timeout occurs when the elapsed time exceeds specified time.

If the answering operation is performed, the controller 100 sends the answer message, the sending destination of which is the relay server 30, to the communication server 20 (Step S2114; Yes→Step S2120). At this time, if the content of the answer message is the content that permits sending of the attachment data to the print server 40 (for example, "Please") (Step S2122; Yes), the controller 100 displays the user number notification message, which is received from the communication server 20, on the display 120 (Step S1112).

Meanwhile, if the operation to send the additional attachment data is performed, the controller 100 determines whether an over page number message (a page number exceeding message) is received from the relay server 30 (Step S2116; Yes→Step S2124). The over page number message is a message with a content indicating that the number of the pieces of the attachment data sent by the user exceeds the number that can be accepted by the network print system 1 for the registration at a time. The number of the pieces of the attachment data that can be accepted for the registration only has to be determined in advance by an administrator of the network print system 1, or the like.

If the over page number message is not received, the processing returns to Step S2106 (Step S2124; No→Step S2106). On the other hand, if over page number message is received, the over page number message is displayed on the display 120, and the processing returns to Step 2112 (Step S2124; Yes→Step S2126→Step S2112).

In the case of the timeout (Step S2118; Yes), or if the content of the answer message is not to permit sending of the attachment data to the print server 40 (for example, "quit") (Step S2122; For No), the registration cancellation message is sent from the relay server 30 to the terminal 12. The registration cancellation message is a message that has a content indicating that the attachment data is not sent to the print server 40 and thus neither the attachment data nor the print data is stored (registered) in the print server 40. When the controller 100 receives the registration cancellation message, the sending source of which is the relay server 30, from the communication server 20, the message included in the registration cancellation message is displayed on the display 120 (Step S2128).

2.2.3 Processing of Communication Server

Figure 20:
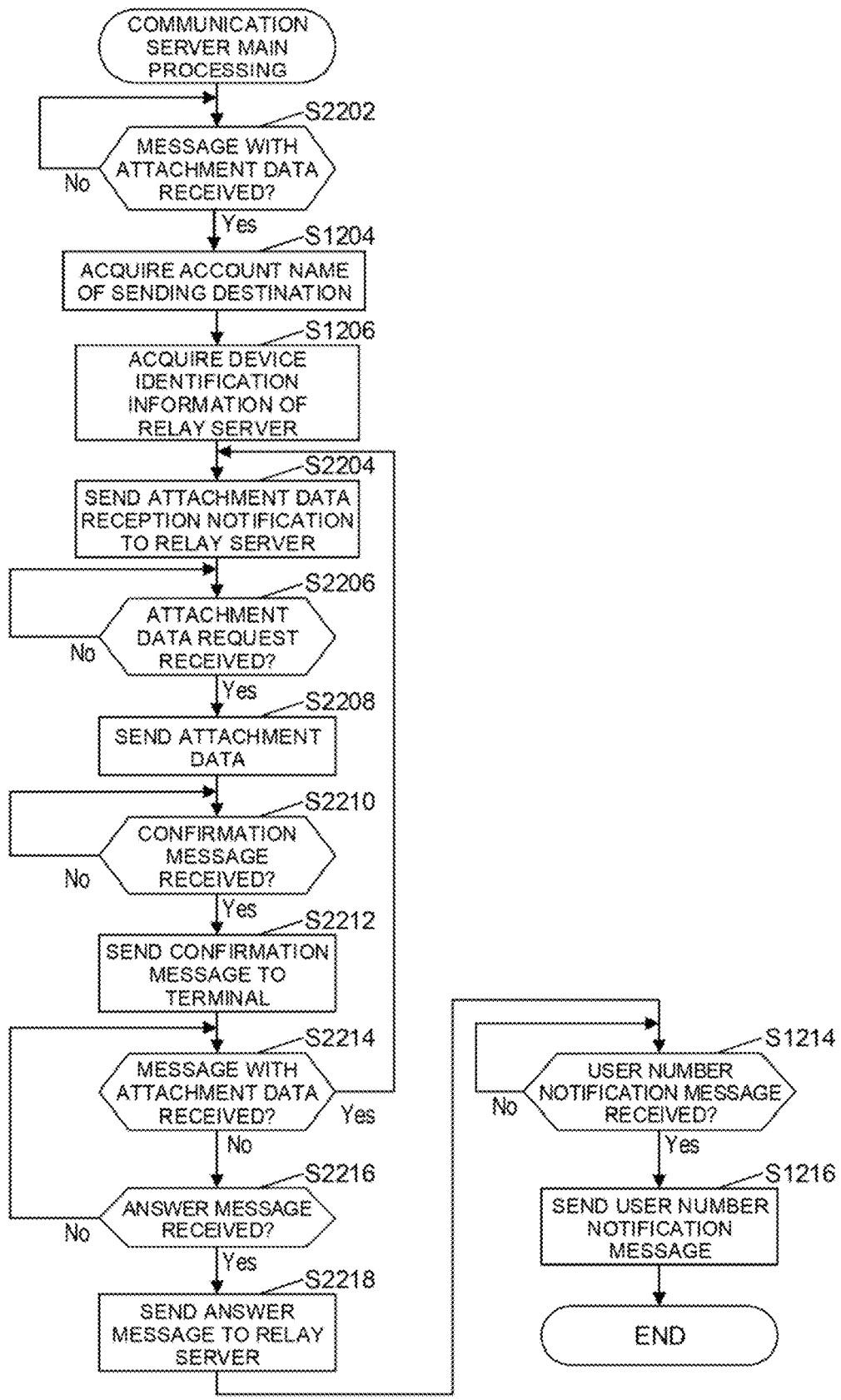
FIG. 20 is a flowchart for illustrating a flow of main processing of a communication server in the second embodiment.

A description will be made on processing of the communication server 20 with reference to FIG. 20. First, the controller 200 determines whether the message with the attachment data is received from the terminal 12 (Step S2202). If the message with the attachment data is received, the account name of the sending destination of the message with the attachment data is acquired, and the device identification information on the relay server 30 is acquired by the function of the message reception notification program 224, the attachment data reception notification is sent to the relay server 30 (Step S1204→Step S1206→Step S2204).

Next, if the controller 200 receives the attachment data request from the relay server 30, the controller 200 sends the attachment data on the basis of the attachment data request (Step S2206; Yes→Step S2208). Then, if the controller 200 receives the confirmation message, the sending destination of which is the terminal 12, from the relay server 30, the controller 200 sends the confirmation message to terminal 12 (Step S2210; Yes→Step S2212). Here, there is a case where, as a result of sending the attachment data to the relay server 30 in Step S2208, the relay server 30 sends the re-sending message, the sending destination of which is the terminal 12, or the over page number message to the communication server 20. In such a case, similar to sending of the confirmation message, the controller 200 sends the re-sending message or the over page number message, which is received from the relay server 30, to the terminal 12.

Next, if the controller 200 receives the message with the additional attachment data from the terminal 12, the processing returns to Step S2204 (Step S2214; Yes→Step S2204). If not, the controller 200 determines whether the answer message, the sending destination of which is the relay server 30, is received from the terminal 12 (Step S2214; No→Step S2216). If the answer message is received, the controller 200 sends the answer message to the relay server 30 (Step S2216; Yes→Step S2218). If the answer message is not received, the processing returns to Step S2214 (Step S2216; No→Step S2214).

2.2.4 Processing of Relay Server

Figure 21:
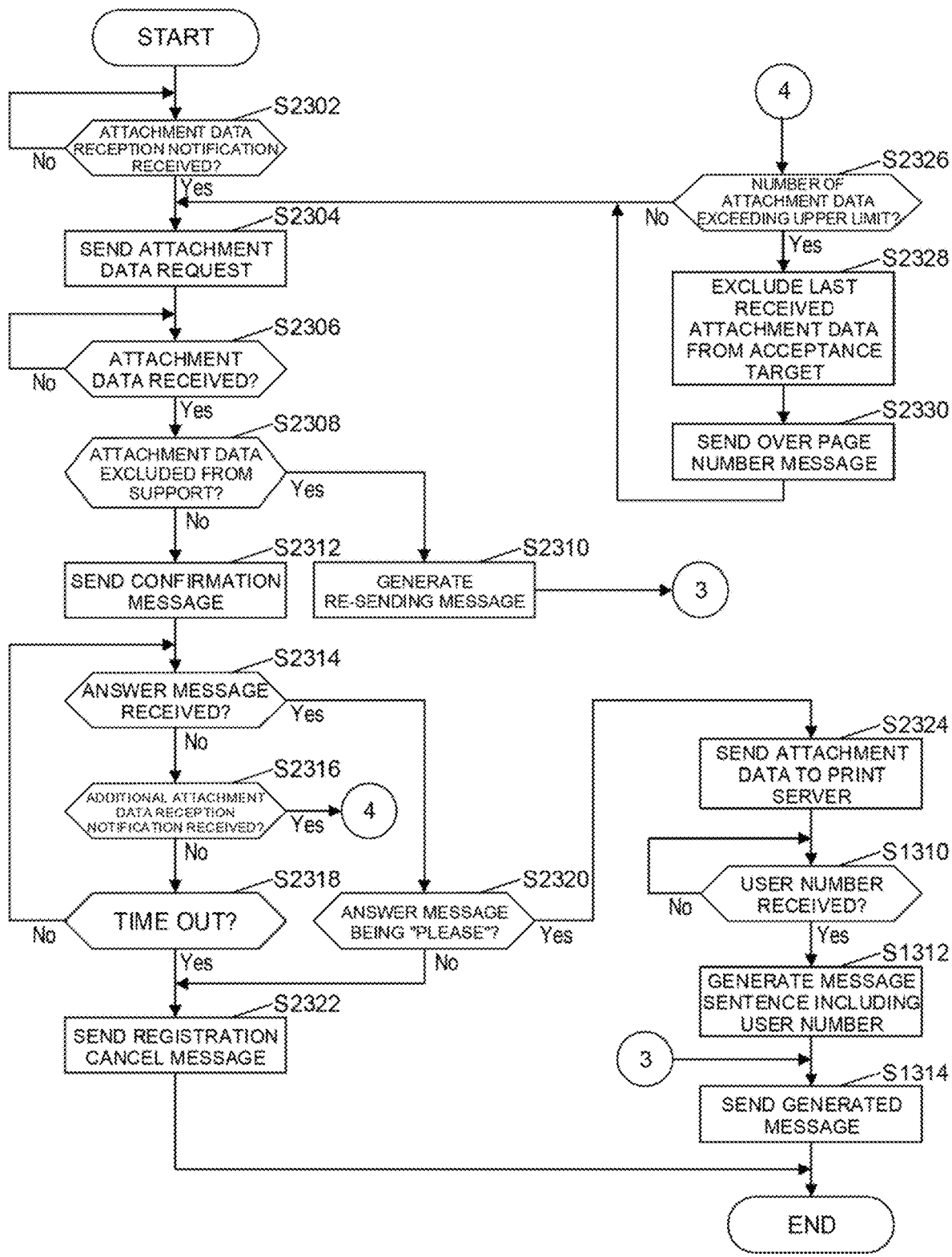
FIG. 21 is a flowchart for illustrating a flow of main processing of a relay server in the second embodiment.

A description will be made on processing of the relay server 30 with reference to FIG. 21. First, the controller 300 determines whether the attachment data reception notification is received from the communication server 20 (Step S2302). If the attachment data reception notification is received, the controller 300 sends the attachment data request to the communication server 20 (Step S2304). Then, if the controller 300 receives the attachment data from the communication server 20, the controller 300 determines whether the attachment data is not supported (Step S2306; Yes→Step S2308). More specifically, the controller 300 determines whether the network print system 1 can accept the received attachment data for the registration on the basis of the format of the attachment data, the data size, the image size, or the like. If the attachment data is not supported, the re-sending message that prompts re-sending of the attachment data is generated by the function of the response program 322 (Step S2308; Yes→Step S2310).

If the attachment data is supported, the confirmation message is generated by the function of the response program 322, and the confirmation message, the sending destination of which is the terminal 12, is sent to the communication server 20 (Step S2312). Next, the controller 300 determines whether the answer message is received from the communication server 20 and whether the additional attachment data reception notification is received until the timeout (Step S2314→Step S2316→Step S2318).

If the answer message is received (Step S2314; Yes), the controller 300 determines the content of the answer message (Step S2320). If the content of the answer message is the content that permits sending of the attachment data to the print server 40 (for example, "Please"), the controller 300 sends the attachment data to the print server 40 (Step S2320; Yes→Step S2324).

If the additional attachment data reception notification is received (Step S2314; No→Step S2316; Yes), the controller 300 determines whether the received number of the pieces of the attachment data exceeds a predetermined upper limit (Step S2326). If the received number of the pieces of the attachment data exceeds the upper limit, the controller 300 excludes the last-received attachment data from an acceptance target by the network print service (Step S2326; Yes→Step S2328). Just as described, the attachment data is sent to the print server 40 in such a range where the received number of the pieces of the attachment data does not exceed the upper limit. Then, the controller 300 generates the over page number message by the function of the relay program 324, and sends the over page number message, the sending destination of which is the terminal 12, to the communication server 20 (Step S2330).

2.2.5 Processing of Print Server

Figure 22:
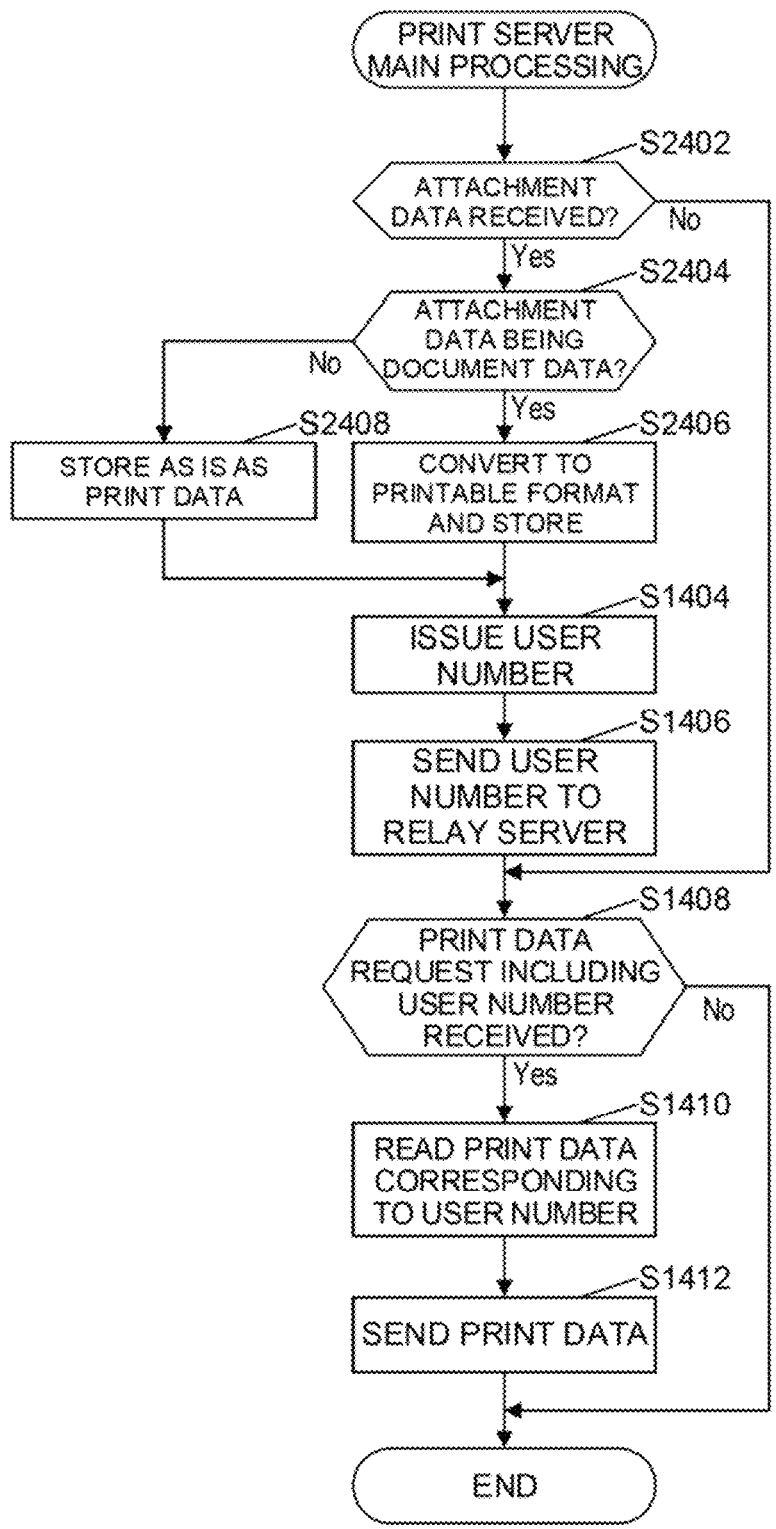
FIG. 22 is a flowchart for illustrating a flow of main processing of a print server in the second embodiment.

A description will be made on processing of the print server 40 with reference to FIG. 22. First, the controller 400 determines whether the attachment data is received from the relay server 30 (Step S2402). If the attachment data is received, the controller 400 determines whether the received attachment data is the document data (Step S2404). If the attachment data is the document data, the controller 400 stores the print data, which is converted by the function of the print data conversion program 424 in the print data storage area 436 (Step S2404; Yes→Step S2406). If the attachment data is the image data, the controller 400 stores, as the print data, the image data as is in the print data storage area 436 (Step S2404; No→Step S2408). Similar to the first embodiment, the controller 400 may store the print data, which is output by the function of the print data conversion program 424, in the print data storage area 436.

2.3 Operation Example

Figure 23:
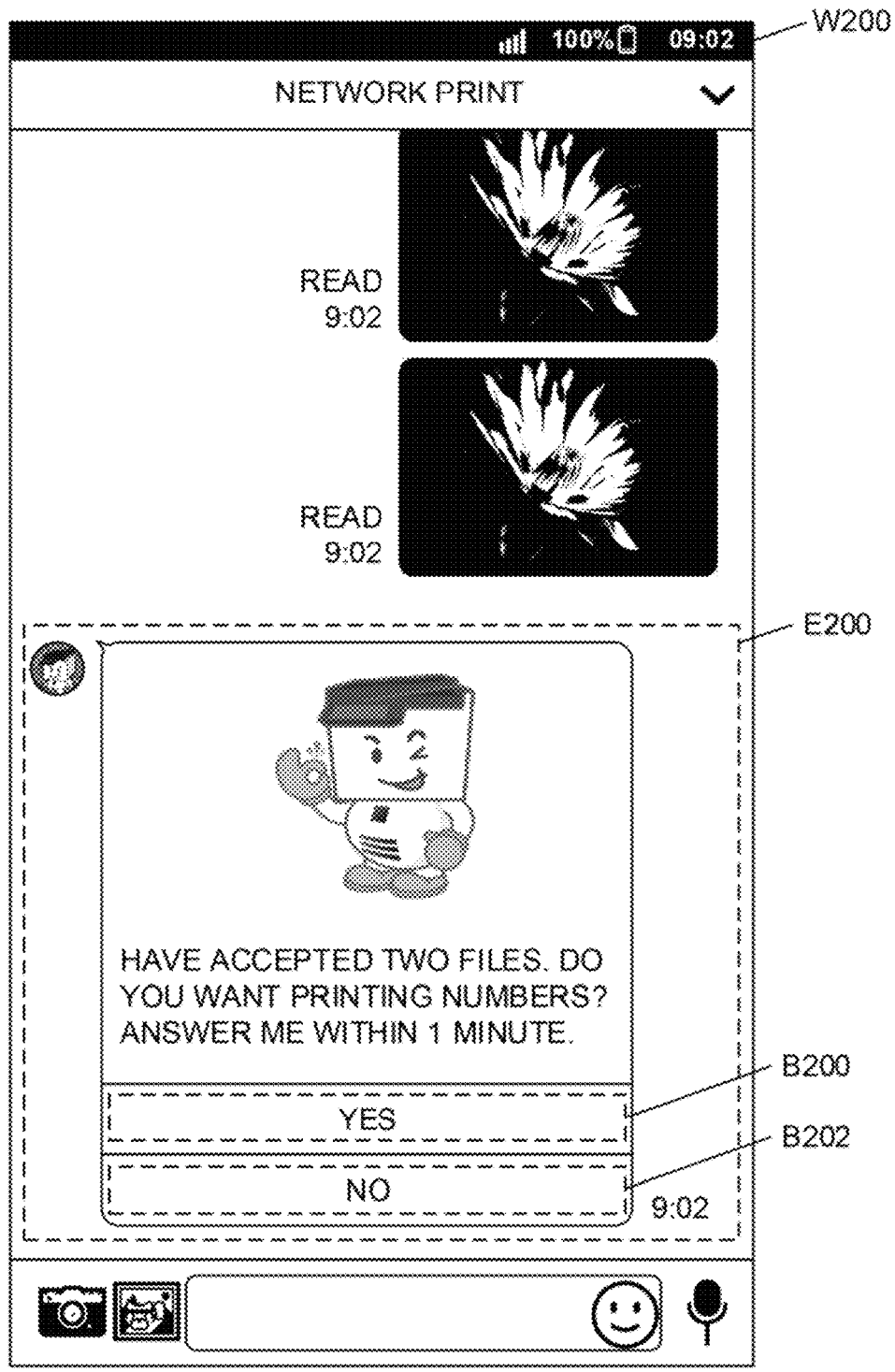
FIG. 23 is a view of an operation example in the second embodiment.

Next, a description will be made on an operation example with reference to the drawings. FIG. 23 is a view of an example of a display screen W200 that is displayed on the display 120 when the controller 100 runs the message exchange program 152. The display screen W200 illustrates the operation example of a case where the confirmation message is displayed after two pieces of the image data are sent to the relay server 30.

In an area E200 where the confirmation message is displayed, in addition to the message regarding the number of the received image data (for example, "accept two files"), option buttons used to designate whether to send the image data to the print server 40 is provided. As the option buttons, a button B200 used to permit sending to the print server 40 and a button B202 used not to permit sending to the print server 40 are provided. The user selects one of the button B200 and the button B202, so as to be able to send the answer message.

Figure 24:
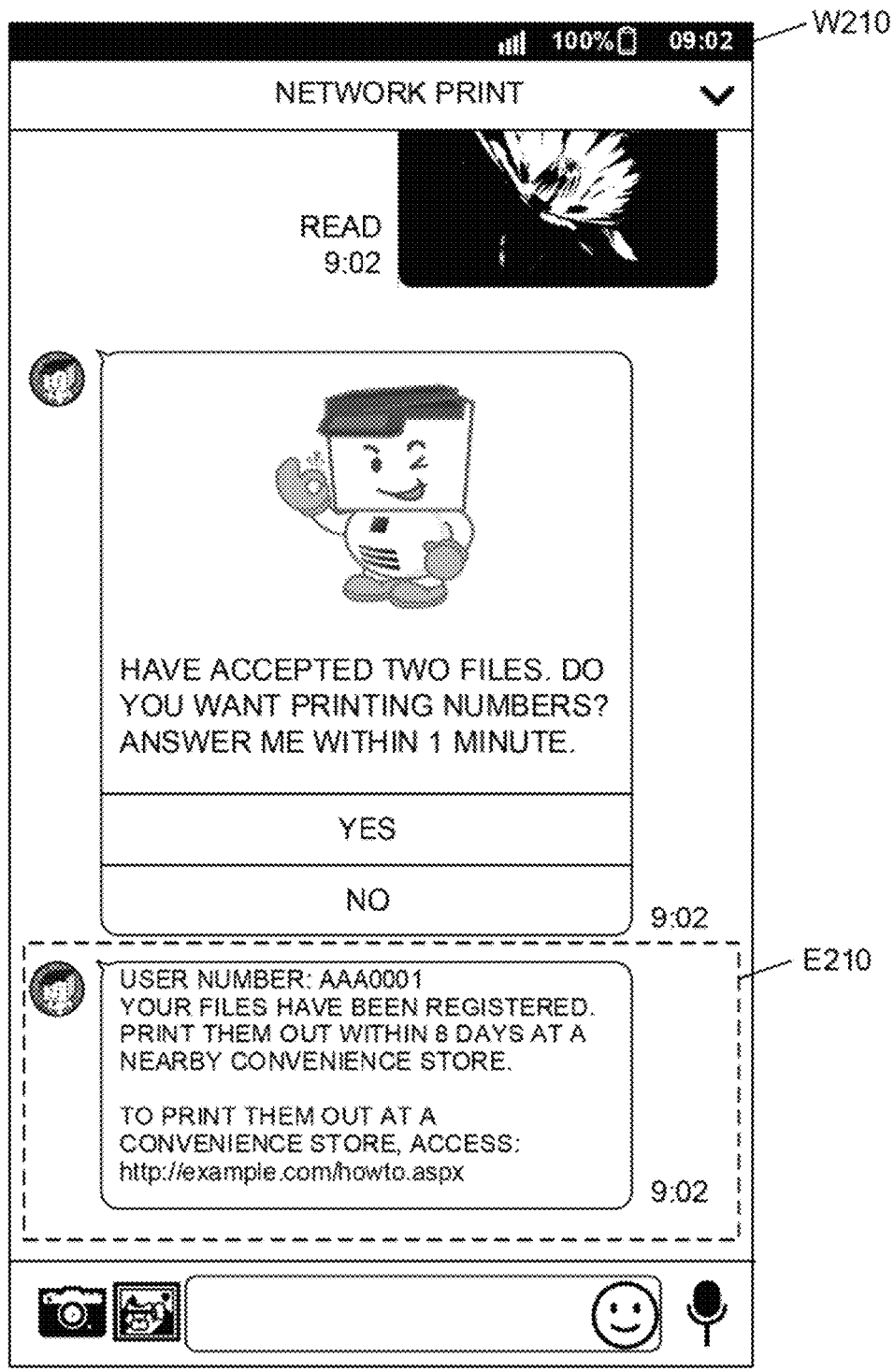
FIG. 24 is a view of an operation example in the second embodiment.

FIG. 24 is a view of an example of a display screen W210 that is displayed on the display 120 when the button B200 is selected in FIG. 23. In the case where the button B200 is selected, the relay server 30 sends the user number notification message, the sending destination of which is the terminal 12. Accordingly, an area E210 in which the message based on the user number notification message is displayed is displayed on the display 120. By checking the area E210, the user can know the user number.

Figure 25:
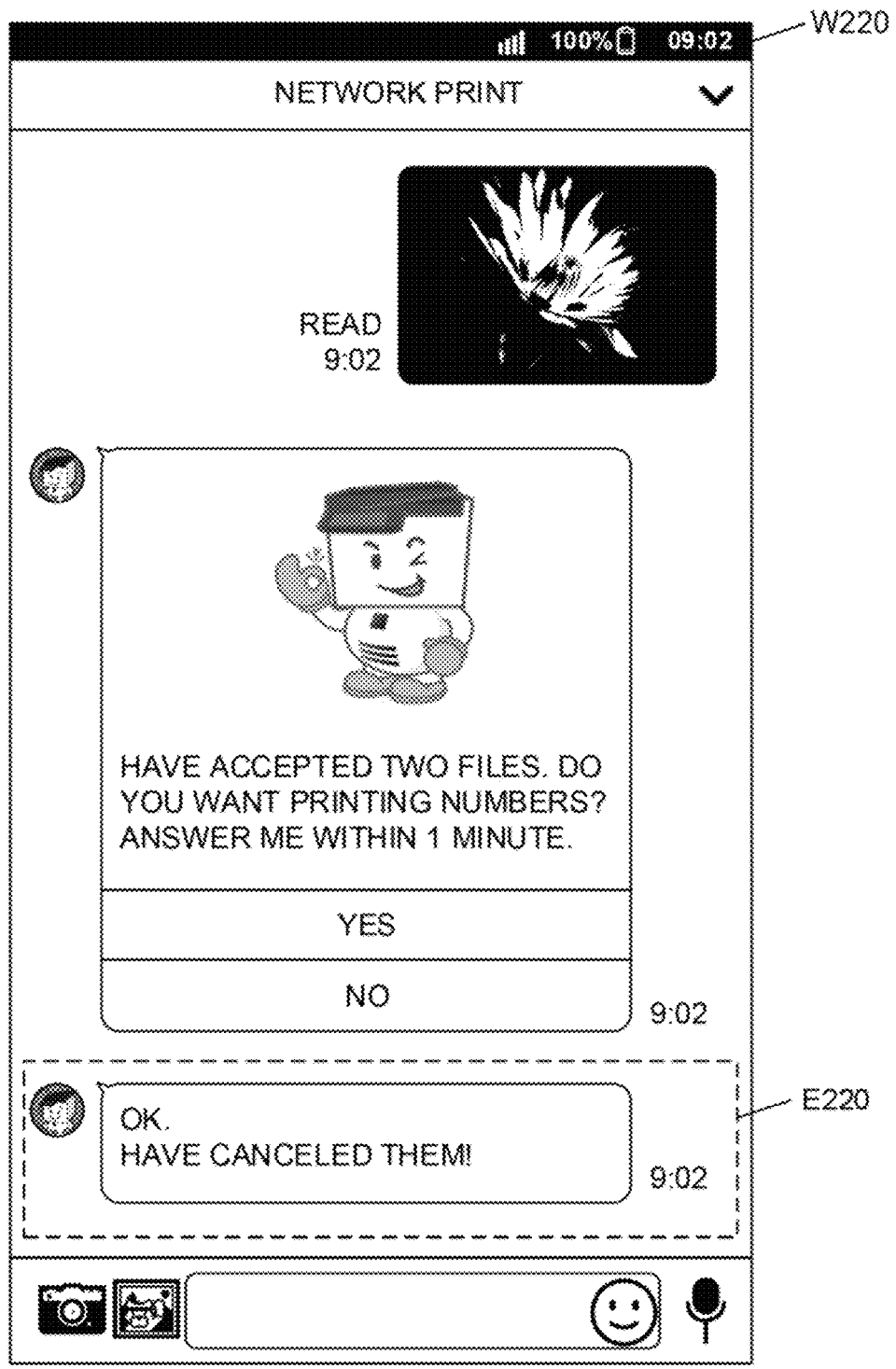
FIG. 25 is a view of an operation example in the second embodiment.

FIG. 25 is a view of an example of a display screen W220 that is displayed on the display 120 when the button B202 is selected in FIG. 23. In the case where the button B202 is selected, the relay server 30 sends the registration cancellation message, the sending destination of which is the terminal 12. Accordingly, an area E220 in which the message based on the registration cancellation message is displayed is displayed on the display 120. By checking the area E220, the user can confirm that the image data is not sent to the print server 40.

Figure 26:
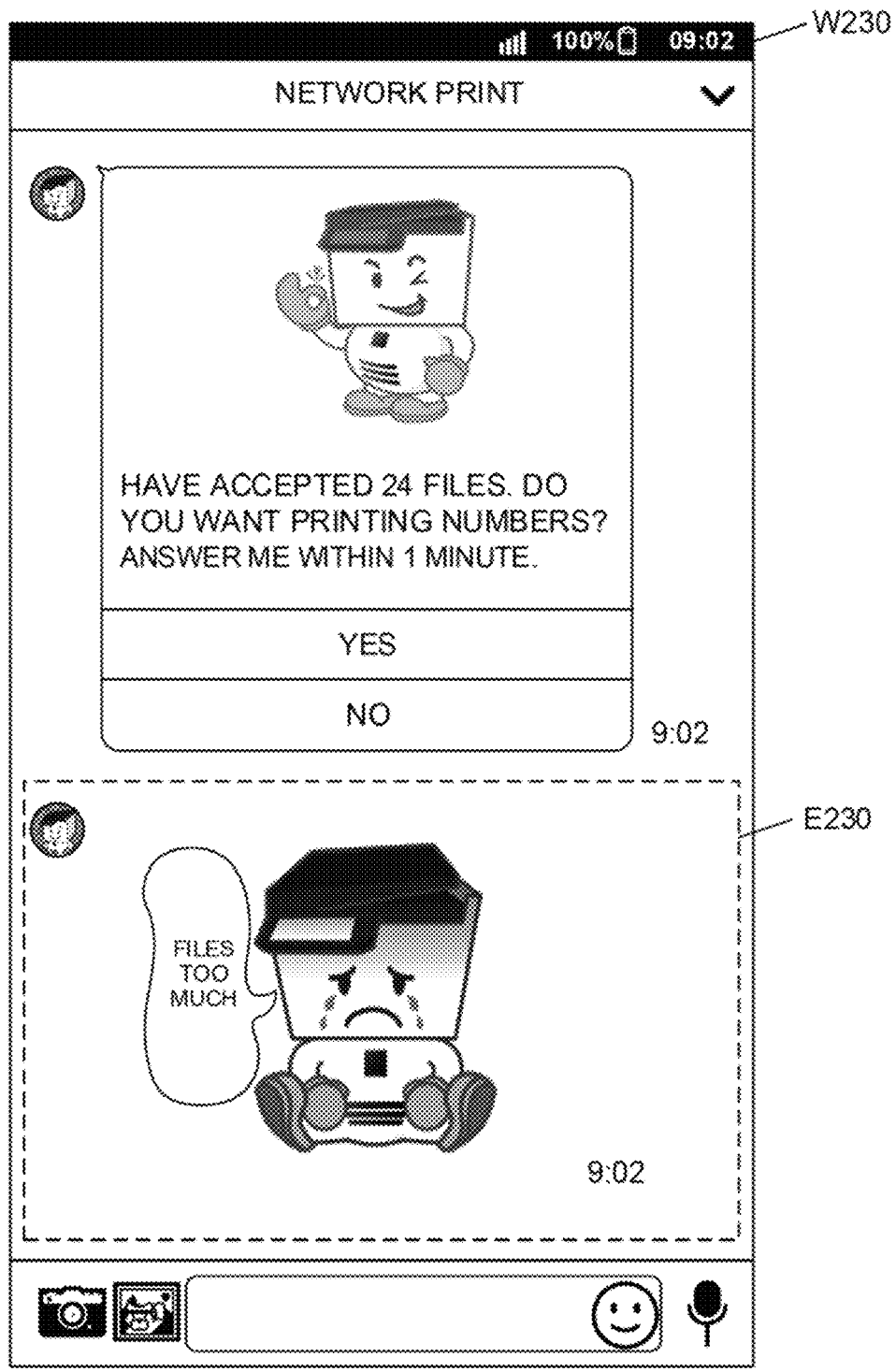
FIG. 26 is a view of an operation example in the second embodiment.

FIG. 26 is a view of an example of a display screen W230 that is displayed on the display 120 in the case where the large number of the pieces of the attachment data is sent to the relay server 30 and exceeds the number of the data that can be accepted for the registration. In such a case, the relay server 30 sends the over page number message, the sending destination of which is the terminal 12. Accordingly, an area E230 in which the message based on the over page number message is displayed is displayed on the display 120. By checking the area E230, the user can confirm that the large number of the attachment data is sent.

In this case, the relay server 30 may send the attachment data in a range of not exceeding the number of the data that can be accepted for the registration to the print server 40, or may not send all the attachment data to the print server 40. In addition, the over page number message may have such a content that allows the user to confirm which of the attachment data is sent to the print server 40.

Figure 27:
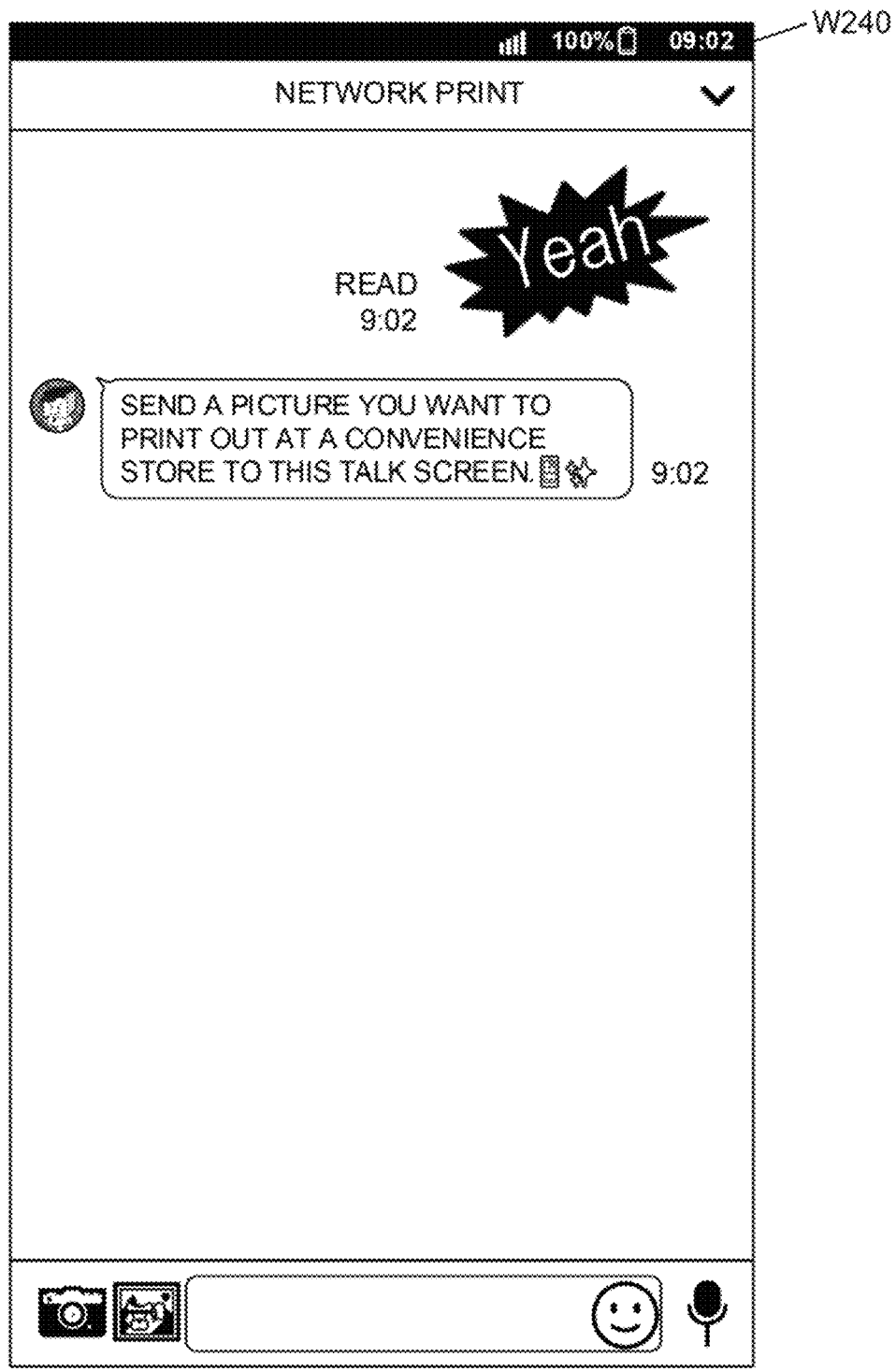
FIG. 27 is a view of an operation example in the second embodiment.

FIG. 27 is a view of an example of a display screen W240 that is displayed on the display 120 when an image other than the image data is sent to the relay server 30. The image other than the image data is an image that can only be used in the messenger application, and is an image called a stamp or a sticker, for example. Such an image is not an image that is printed out by the image forming apparatus 50. In the case where such an image is sent as the message from the terminal 12, the relay program 324 may generate the message that prompts the user to send the image data. The message including the generated message is sent to the communication server 20 with the terminal 12 being the sending destination. By checking the message that prompts sending of the image data, the user can check sending of the image data. Here, in the case where the user sends a greeting or a sentence such as "I don't know" as the message, the relay program 324 may generate and send a message about how to use. Just as described, the relay program 324 generates and sends the message according to the content of the message received by the user. In this way, it is possible to provide necessary information to the user and to prompt the user to perform a necessary operation.

According to this embodiment, not only the image data but also the document data can be output. In addition, the message can be sent in the case where it is inquired whether to output the attachment data or in the case where the number of the data that can be accepted for the registration exceeds the upper limit. Thus, improvement in convenience of the user can be expected.

3. Third Embodiment

Next, a description will be made on a third embodiment. Differing from the first embodiment, the third embodiment is an embodiment in which the location of the image forming apparatus in the vicinity of the user is displayed. In this embodiment, the processing of the terminal 10 and the processing of the relay server 30 in the first embodiment and the second embodiment are partially replaced.

In this embodiment, in the print server 40, information such as an address, latitude, and longitude of the placement location of the image forming apparatus 50 as well as the name of the placement store is stored in the unit management information 432. In this way, the placement location of the image forming apparatus 50 can be identified. In this embodiment, the information on the placement location of the image forming apparatus 50 will be referred to as image forming apparatus information.

Figure 28:
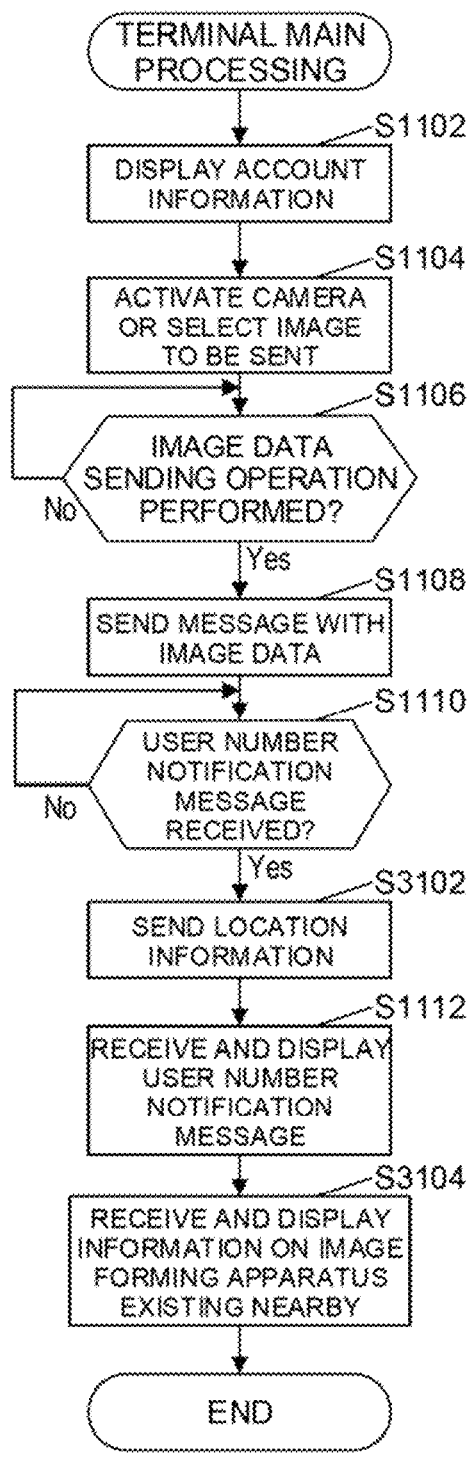
FIG. 28 is a flowchart for illustrating a flow of main processing of a terminal in a third embodiment.

A description will be made on processing executed by the terminal 10 in this embodiment with reference to FIG. 28. FIG. 28 is a flowchart in which additionally executed processing in this embodiment is added to the flowchart of the terminal 10 in the first embodiment, which is illustrated in FIG. 9. In this embodiment, when receiving the user number notification message (Step S1110; Yes), the controller 100 sends the location information to the relay server 30 (Step S3102). As a method for sending the location information, the location information may be set by the message, the location information may be shared with the relay server 30, or the location information may be sent by a method other than the message. In addition, the location information only has to be information on the location of the terminal, such as information on latitude and longitude where the terminal is located, an address, a communicating base station, or the IP address.

When receiving the user number notification message from the relay server 30, the controller 100 displays the user number on the display 120 (Step S1112). Furthermore, when receiving the vicinal image forming apparatus information (for example, the address and the store name of the placement store) from the relay server 30, the controller 100 displays the image forming apparatus information on the display 120 (Step S3104). The terminal 10 receives this image forming apparatus information from the relay server 30 as the message that includes the image forming apparatus information, for example.

In this embodiment, the description has been made that, after receiving the user number notification message, the controller 100 sends the location information. However, timing may differ. For example, the timing at which the controller 100 sends the location information may be timing specified by the user, may be timing after the image data or the attachment data is sent, or may be periodical. In addition, in this embodiment, the description has been made that, after the user number notification message is displayed, the vicinal image forming apparatus information is displayed. However, the vicinal image forming apparatus information may be included in the user number notification message and displayed therewith.

Figure 29:
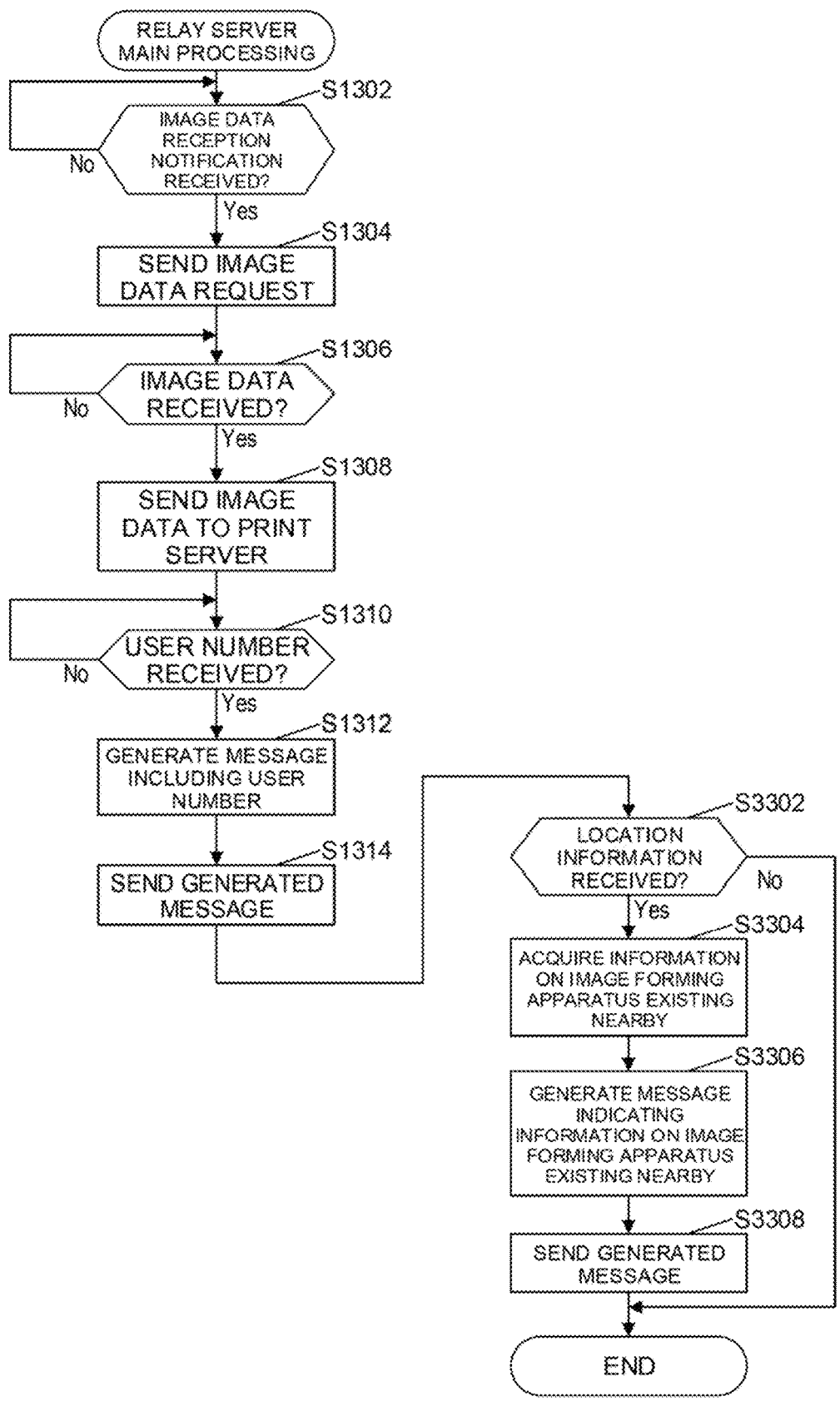
FIG. 29 is a flowchart for illustrating a flow of main processing of a print server in the third embodiment.

Next, a description will be made on processing that is executed by the relay server 30 in this embodiment with reference to FIG. 29. FIG. 29 is a flowchart in which additionally executed processing in this embodiment is added to the flowchart of the relay server 30 in the first embodiment, which is illustrated in FIG. 21. The controller 300 generates a message sentence including the user number and sends the generated message. Then, the controller 300 determines whether the location information is acquired from the terminal 10 (Step S1312→Step S1314→Step S3302). If the location information is acquired from the terminal 10 (Step S3302; Yes), the controller 300 acquires the information on the image forming apparatus 50, which exists in the vicinity of the acquired location information, from the print server 40 (Step S3304). More specifically, when receiving the location information from the relay server 30, the controller 400 compares the location information with the information on the address, the latitude, and the longitude stored in the unit management information 432. Then, as a result of the comparison, the controller 400 sends the information on the image forming apparatus 50, which is close to the received location information, to the relay server 30. At this time, the controller 400 may set the image forming apparatus 50, which exists within a predetermined distance (for example, 500 m) from the received location information, as the image forming apparatus 50 existing nearby. In the case where there are the multiple image forming apparatuses 50 existing nearby, the controller 400 may rearrange an order of the information on the image forming apparatuses 50 in an ascending order of the distance between the received location information and the placement location of the image forming apparatus 50, and may send the information on the image forming apparatuses 50 to the relay server 30. On the contrary, in the case where the image forming apparatus 50 existing nearby does not exist, the controller 400 may set information indicating that the image forming apparatus 50 does not exist nearby to the relay server 30.

Next, based on the information on the image forming apparatus 50 received from the print server 40, the controller 300 generates a message including the vicinal image forming apparatus information by the function of the response program 322 (Step S3306). Then, the controller 300 sends the generated message to the communication server 20 with the terminal 10 being the sending destination (Step S3308).

FIG. 28 and FIG. 29 are the flowcharts in which the additionally executed processing in this embodiment is added to the flowcharts of the terminal 10 and the relay server 30 in the first embodiment. However, the processing in this embodiment may also be added to the processing in the second embodiment. More specifically; in the flowchart of the terminal 12, which is illustrated in FIG. 19, the processing in Step S3102 is executed before the processing in Step S1112, and the processing in Step S3104 is executed after Step S1112. In addition, in FIG. 21, the processing in Step S3302 to Step S3308 is executed after Step S1314. In this way, in addition to the processing in the second embodiment, the message indicating the vicinal image forming apparatus information can be displayed on the terminal 12.

Figure 30:
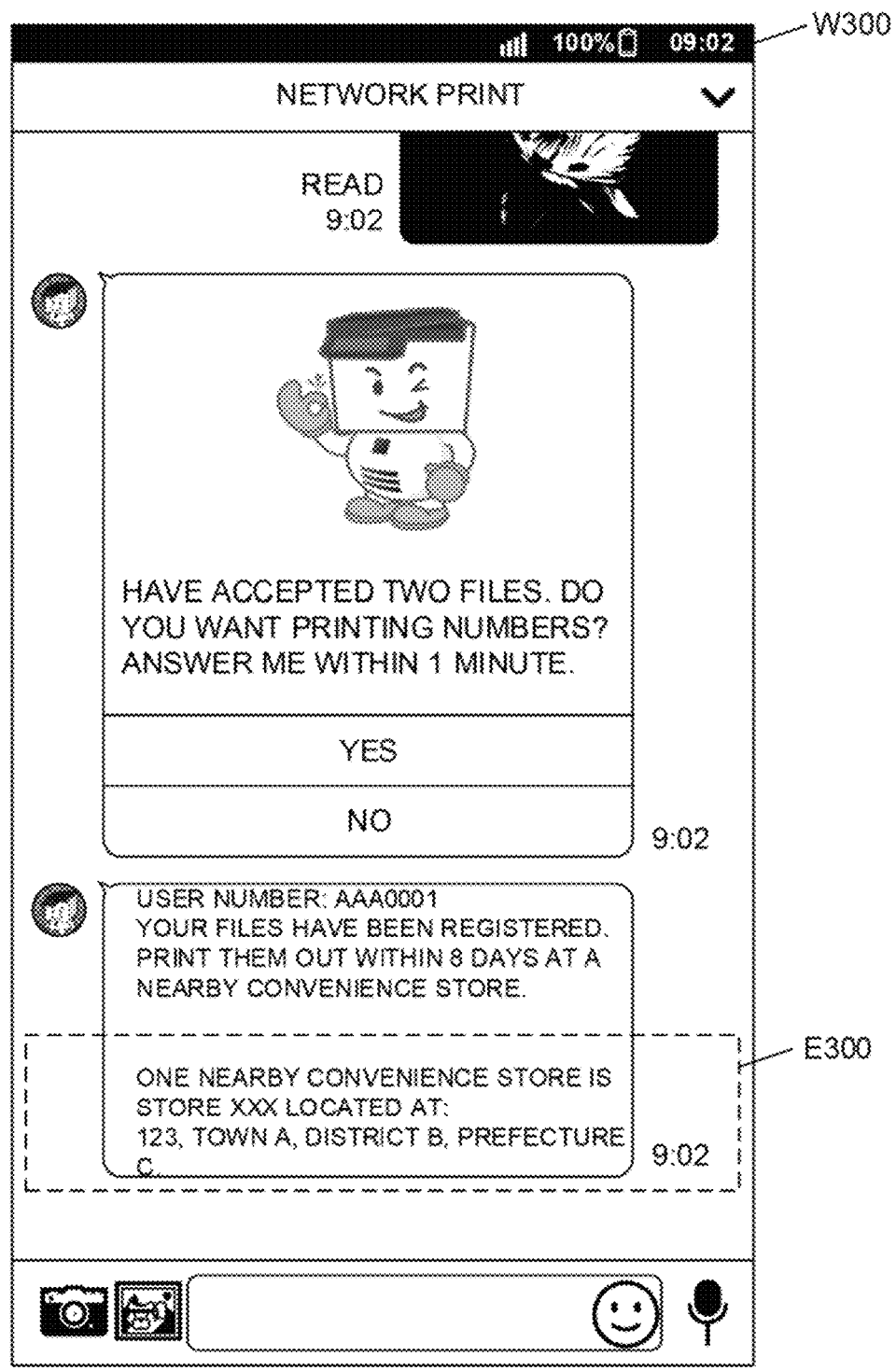
FIG. 30 is a view of an operation example in the third embodiment.

A description will be made on an operation example in this embodiment with reference to FIG. 30. FIG. 30 is a view of an example of a display screen W300 that is displayed on the display 120 when the user number notification message is received. In the example of FIG. 30, the user number notification message includes information E300 (for example, the name of the store placing the image forming apparatus 50 and the address of the store) on the image forming apparatus 50 that exists in the vicinity of the terminal 10. The message that includes the information on the image forming apparatus 50 existing in the vicinity of the terminal 10 may be displayed in addition to the user number notification message.

In FIG. 30, the name and the address of the store are displayed as the information on the image forming apparatus 50. However, in addition to those, information, such as a link to a map providing a route to the placement location of the image forming apparatus 50, required time, distance, and store hours, may be provided.

4. Modified Embodiments

The present invention is not limited to each of the above-described embodiments, and various modifications can be made thereto. That is, an embodiment that can be obtained by combining technical means appropriately modified within the scope that does not depart from the gist of the present invention is also included in the technical scope of the present invention. In addition, the contents described in the processing of each of the embodiments merely constitute an example of the processing for realizing the object of the present invention. Thus, an order of steps can be changed, and some of steps can be omitted within the scope that is not contradictory.

Furthermore, due to convenience of the description, the above-described embodiments are separately described. However, it is needless to say that the embodiments can be combined and implemented within the scope that is technically possible.

In each of the embodiments, the program that is operated in each of the devices is a program that controls the CPU and the like, so as to realize the functions of each of the above-described embodiments (a program that causes the computer to function). The information handled by these devices are temporarily stored in a temporary storage device (for example, RAM) at the time of processing, is thereafter stored in storage devices such as various types of Read Only Memory (ROM) and the HDD, is read by the CPU when necessary, and is corrected and written.

Here, as the recording medium that stores the program, any of a semiconductor medium (for example, ROM, a non-volatile memory card, or the like), an optical recording medium/magneto-optical recording medium (for example, a Digital Versatile Disc (DVD), a Magneto Optical Disc (MO), Mini Disc (MD), a Compact Disc (CD), a Blu-ray Disc (BD)®, or the like), a magnetic recording medium (for example, a magnetic tape, a flexible disk, or the like), and the like may be used. In addition, there is a case where not only the function of each of the above-described embodiments is realized by executing the loaded program but the function of the present invention is also realized by cooperative processing with an operation system, another application program, or the like on the basis of an instruction of the program.

In the case where the program is distributed to the market, the program can be stored and distributed in a portable recording medium, or can be transferred to a server computer that is connected via the network such as the Internet. It is needless to say that, in this case, a storage device of the server computer is also included in the present invention.

What is claimed is:

1. An output method for receiving output data that is associated with acquired identification information from a server and outputting an image based on the output data from an image forming apparatus, the output method comprising:
    accepting, by the server, posting of a message from a terminal to a messaging service;
    sending, by the terminal, attachment data to the server when the message includes the attachment data; and
    issuing, by the server, identification information that is associated with output data based on the attachment data when the attachment data is in a format that can be accepted for registration,
    wherein
    when the attachment data is sent to the server, multiple pieces of attachment data can be sent to the server, and the output method further comprises:
    posting, by the server, a message indicative of an error to the messaging service when a number of the multiple pieces of attachment data that are sent exceeds an upper limit number.

2. The output method according to claim 1, further comprising:
    posting a message indicative of an error to the messaging service when the attachment data is not in the format that can be accepted for registration.

3. The output method according to claim 2, wherein a case where the attachment data is not in the format that can be accepted for registration includes a case where the attachment data is data in a format that cannot be read by the server.

4. The output method according to claim 1, further comprising:
    acquiring location information of the terminal; and
    posting location of an image forming apparatus that is present around the terminal to the messaging service based on the location information.

5. A system comprising:
    a terminal;
    an image forming apparatus;
    a communication server;
    a print server; and
    a relay server that can be connected to the communication server and the print server, wherein
    the communication server includes:
        an acceptor that accepts posting of a message from the terminal; and
        a first controller that notifies the relay server that attachment data is received when the attachment data is included in the message,
    the relay server includes:
        a receiver that receives the attachment data from the communication server upon reception of a notification; and
        a sender that sends the attachment data received by the receiver to the print server,
    the print server includes:
        a storage that stores the attachment data as output data; and a second controller that issues identification information for identifying the output data, the image forming apparatus includes:

a receiver that acquires the identification information and receives output data associated with the identification information from the print server; and an output device that outputs an image based on the output data, the relay server can send multiple pieces of attachment data to the print server, and the relay server posts a message indicative of an error to the communication server when a number of the multiple pieces of attachment data that are sent exceeds an upper limit number.

* * * * *